(12) United States Patent
Fujii et al.

(10) Patent No.: US 8,545,708 B2
(45) Date of Patent: Oct. 1, 2013

(54) MOLD AND MANUFACTURING METHOD THEREFOR

(75) Inventors: Akiyoshi Fujii, Osaka (JP); Kiyoshi Minoura, Osaka (JP); Akinobu Isurugi, Osaka (JP); Hidekazu Hayashi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 201 days.

(21) Appl. No.: 13/266,686

(22) PCT Filed: Apr. 26, 2010

(86) PCT No.: PCT/JP2010/002989
§ 371 (c)(1),
(2), (4) Date: Oct. 27, 2011

(87) PCT Pub. No.: WO2010/125795
PCT Pub. Date: Nov. 4, 2010

(65) Prior Publication Data
US 2012/0043297 A1 Feb. 23, 2012

(30) Foreign Application Priority Data
Apr. 30, 2009 (JP) ................................ 2009-111330

(51) Int. Cl.
*B44C 1/22* (2006.01)
*B29D 7/00* (2006.01)

(52) U.S. Cl.
USPC .............. 216/11; 216/83; 216/102; 264/1.34; 264/2.5; 205/223; 205/229

(58) Field of Classification Search
None
See application file for complete search history.

(56) References Cited

U.S. PATENT DOCUMENTS

| 4,190,321 A | 2/1980 | Dorer et al. |
| 4,193,848 A | 3/1980 | Severus-Laubenteid ....... 204/28 |
| 4,252,843 A | 2/1981 | Dorer et al. |
| 5,759,455 A * | 6/1998 | Kamitakahara et al. ..... 264/1.34 |
| 6,359,735 B1 | 3/2002 | Gombert et al. |
| 2003/0205475 A1 | 11/2003 | Sawitowski |
| 2007/0159698 A1* | 7/2007 | Taguchi et al. ............... 359/586 |
| 2009/0194914 A1* | 8/2009 | Uozu et al. .................... 264/496 |

FOREIGN PATENT DOCUMENTS

| EP | 0 756 197 | 1/1997 |
| EP | 2 418 305 | 2/2012 |
| JP | 53-103754 A | 9/1978 |
| JP | 08-072091 | 3/1996 |

(Continued)

OTHER PUBLICATIONS

International Preliminary Report on Patentability dated Dec. 22, 2011.

*Primary Examiner* — Anita Alanko
(74) *Attorney, Agent, or Firm* — Harness, Dickey & Pierce, P.L.C.

(57) ABSTRACT

A mold of the present invention includes: a flexible polymer film; a curable resin layer provided on a surface of the polymer film; and a porous alumina layer provided on the curable resin layer, the porous alumina layer having an inverted moth-eye structure in its surface, the inverted moth-eye structure having a plurality of recessed portions whose two-dimensional size viewed in a direction normal to the surface is not less than 10 nm and less than 500 nm. According to the present invention, a method for easily forming a flexible moth-eye mold which can be deformed into the form of a roll is provided.

15 Claims, 12 Drawing Sheets

(56) References Cited

FOREIGN PATENT DOCUMENTS

| | | |
|---|---|---|
| JP | 10-316858 | 2/1998 |
| JP | 2000334745 A | 12/2000 |
| JP | 2001517319 A | 10/2001 |
| JP | 2003531962 A | 10/2003 |
| JP | 2005156695 A | 6/2005 |
| WO | WO-2006059686 A1 | 6/2006 |

* cited by examiner (a)

(b)

(a)

(b)

(a)

(b)

(a)

(b)

(c)

(a)                  (b)

(a)

(b)

(c)

(a)

(b)

(a)

(b)

(c)

(a)

(b)

MOLD AND MANUFACTURING METHOD THEREFOR

TECHNICAL FIELD

The present invention relates to a mold and a method for manufacturing the mold. In this specification, the "mold" includes molds that are for use in various processing methods (stamping and casting), and is sometimes referred to as a stamper. The mold can also be used for printing (including nanoprinting).

BACKGROUND ART

Display devices for use in TVs, cell phones, etc., and optical elements, such as camera lenses, etc., usually adopt an antireflection technique in order to reduce the surface reflection and increase the amount of light transmitted therethrough. This is because, when light is transmitted through the interface between media of different refractive indices, e.g., when light is incident on the interface between air and glass, the amount of transmitted light decreases due to, for example, Fresnel reflection, thus deteriorating the visibility.

An antireflection technique which has been receiving attention in recent years is forming over a substrate surface a very small uneven pattern in which the interval of recessed portions or raised portions is not more than the wavelength of visible light ($\lambda$=380 nm to 780 nm). See Patent Documents 1 to 4. The two-dimensional size of a raised portion of an uneven pattern which performs an antireflection function is not less than 10 nm and less than 500 nm.

This method utilizes the principles of a so-called moth-eye structure. The refractive index for light that is incident on the substrate is continuously changed along the depth direction of the recessed portions or raised portions, from the refractive index of a medium on which the light is incident to the refractive index of the substrate, whereby reflection of a wavelength band that is subject to antireflection is prevented.

The moth-eye structure is advantageous in that it is capable of performing an antireflection function with small incident angle dependence over a wide wavelength band, as well as that it is applicable to a number of materials, and that an uneven pattern can be directly formed in a substrate. As such, a high-performance antireflection film (or antireflection surface) can be provided at a low cost.

As the method for forming a moth-eye structure, using an anodized porous alumina layer which is obtained by means of anodization (or "anodic oxidation") of aluminum has been receiving attention (Patent Documents 2 to 4).

Now, the anodized porous alumina layer which is obtained by means of anodization of aluminum is briefly described. Conventionally, a method for forming a porous structure by means of anodization has been receiving attention as a simple method for making nanometer-scale micropores (very small recessed portions) in the shape of a circular column in a regular arrangement. An aluminum base is immersed in an acidic electrolytic solution of sulfuric acid, oxalic acid, phosphoric acid, or the like, or an alkaline electrolytic solution, and this is used as an anode in application of a voltage, which causes oxidation and dissolution. The oxidation and the dissolution concurrently advance over a surface of the aluminum base to form an oxide film which has micropores over its surface. The micropores, which are in the shape of a circular column, are oriented vertical to the oxide film and exhibit a self-organized regularity under certain conditions (voltage, electrolyte type, temperature, etc.). Thus, this anodized porous alumina layer is expected to be applied to a wide variety of functional materials.

A porous alumina layer formed under specific conditions includes cells in the shape of a generally regular hexagon which are in a closest packed two-dimensional arrangement when seen in a direction perpendicular to the film surface. Each of the cells has a micropore at its center. The arrangement of the micropores is periodic. The cells are formed as a result of local dissolution and growth of a coating. The dissolution and growth of the coating concurrently advance at the bottom of the micropores which is referred to as a barrier layer. As known, the size of the cells, i.e., the interval between adjacent micropores (the distance between the centers), is approximately twice the thickness of the barrier layer, and is approximately proportional to the voltage that is applied during the anodization. It is also known that the diameter of the micropores depends on the type, concentration, temperature, etc., of the electrolytic solution but is, usually, about ⅓ of the size of the cells (the length of the longest diagonal of the cell when seen in a direction vertical to the film surface). Such micropores of the porous alumina may constitute an arrangement which has a high regularity (periodicity) under specific conditions, an arrangement with a regularity degraded to some extent depending on the conditions, or an irregular (non-periodic) arrangement.

Patent Document 2 discloses a method for producing an antireflection film (antireflection surface) with the use of a stamper which has an anodized porous alumina film over its surface.

Patent Document 3 discloses the technique of forming tapered recesses with continuously changing pore diameters by repeating anodization of aluminum and a pore diameter increasing process.

The present applicant discloses in Patent Document 4 the technique of forming an antireflection film with the use of an alumina layer in which very small recessed portions have stepped lateral surfaces.

As described in Patent Documents 1, 2, and 4, by providing an uneven structure (macro structure) which is greater than a moth-eye structure (micro structure) in addition to the moth-eye structure, the antireflection film (antireflection surface) can be provided with an antiglare function. The two-dimensional size of a raised portion of the uneven structure which is capable of performing the antiglare function is not less than 1 µm and less than 100 µm. The entire disclosures of Patent Documents 1, 2, and 4 are herein incorporated by reference.

Utilizing such an anodized porous aluminum film can facilitate the manufacturing a mold which is used for formation of a moth-eye structure over a surface (hereinafter, "moth-eye mold"). In particular, as described in Patent Documents 2 and 4, when the surface of the anodized aluminum film as formed is used as a mold without any modification, a large effect of reducing the manufacturing cost is achieved. The structure of the surface of a moth-eye mold which is capable of forming a moth-eye structure is herein referred to as "inverted moth-eye structure".

Patent Document 5 describes a method for manufacturing a resin mold in the form of a roll (resin mold roll), which is for use in manufacture of a lens sheet, as described below. First, a metal mold shaped by machining, which has an inverted shape to that of a lens, is pressed against a base in the form of a film (base film) which has a silicone resin layer, thereby forming a mold in the form of a film (mold film) which has the shape of the lens (first transfer). Then, a thermosetting resin is supplied between the mold film and an iron core cylinder while the mold film is wound around the iron core cylinder, and the resin is cured by heat. Thereafter, the mold film is peeled away, whereby a resin mold roll that has a shape which is inverse to that of the lens is obtained (second transfer).

Manufacturing a moth-eye mold in the form of a roll (moth-eye mold roll) based on a manufacturing method that is described in Patent Document 5 with the use of a moth-eye mold manufactured using a porous alumina film which is described in Patent Documents 2 and 4 requires performing the transfer step at least twice. Therefore, the manufacturing process becomes complicated. Since the uneven structure of the moth-eye mold is finer than the uneven structure of the surface of the lens sheet described in Patent Document 5, performing the transfer step twice may increase the probability that the uneven structure will not be accurately transferred.

CITATION LIST

Patent Literature

Patent Document 1: Japanese PCT National Phase Laid-Open Publication No. 2001-517319
Patent Document 2: Japanese PCT National Phase Laid-Open Publication No. 2003-531962
Patent Document 3: Japanese Laid-Open Patent Publication No. 2005-156695
Patent Document 4: WO 2006/059686
Patent Document 5: Japanese Laid-Open Patent Publication No. 2000-334745

SUMMARY OF INVENTION

Technical Problem

In view of the above circumstances, the present inventor conducted researches on manufacturing of a flexible moth-eye mold which can be deformed into the form of a roll. The present inventor attempted to manufacture a moth-eye mold with the use of an aluminum layer formed on the surface of a flexible polymer film and encountered a problem that the adhesion between the aluminum layer and the polymer film was insufficient.

The present invention was conceived for the purpose of solving the above problem. One of the major objects of the present invention is to provide a method for easily manufacturing a flexible moth-eye mold.

Solution to Problem

A flexible mold of the present invention includes: a flexible polymer film; a curable resin layer provided on a surface of the polymer film; and a porous alumina layer provided on the curable resin layer, the porous alumina layer having an inverted moth-eye structure in its surface, the inverted moth-eye structure having a plurality of recessed portions whose two-dimensional size viewed in a direction normal to the surface is not less than 10 nm and less than 500 nm.

In one embodiment, the curable resin layer contains an acrylic resin.

In one embodiment, an inorganic underlayer is provided between the curable resin layer and the porous alumina layer.

In one embodiment, the inorganic underlayer contains $SiO_2$.

In one embodiment, the thickness of the inorganic underlayer is not less than 50 nm and not more than 300 nm.

In one embodiment, a buffer layer which contains aluminum is provided between the inorganic underlayer and the porous alumina layer.

In one embodiment, the curable resin layer contains silica.

In one embodiment, a surface of the curable resin layer has a raised portion whose two-dimensional size is not less than 1 µm and less than 100 µm.

In one embodiment, a surface of the curable resin layer has a periodic uneven structure.

A mold roll of the present invention includes the flexible mold which has the above-described configuration and a base in the form of a roll, wherein the flexible mold is fixed onto a perimeter surface of the base in the form of a roll.

In one embodiment, the flexible mold is arranged such that there is a gap between one end and the other end.

An antireflection structure formation method of the present invention includes the steps of: providing the above-described mold roll and a polarizing plate; and moving the polarizing plate relative to the mold roll such that a polarization axis of the polarizing plate is parallel to a perimeter direction of the mold roll before forming the moth-eye structure on the polarizing plate.

In one embodiment, the polarizing plate has a rectangular shape, and a perimeter length of the mold roll is greater than a long side of the polarizing plate.

A flexible mold manufacturing method of the present invention is a method for manufacturing a flexible mold that has an inverted moth-eye structure in its surface, the inverted moth-eye structure having a plurality of recessed portions whose two-dimensional size viewed in a direction normal to the surface is not less than 10 nm and less than 500 nm, the method including the steps of: (a) providing a mold base which includes a flexible polymer film, a curable resin layer provided on a surface of the polymer film, and an aluminum layer provided on the curable resin layer; (b) partially anodizing the aluminum layer to form a porous alumina layer which has a plurality of very small recessed portions; (c) after step (b), allowing the porous alumina layer to be in contact with an etching solution, thereby enlarging the plurality of very small recessed portions of the porous alumina layer; and (d) after step (c), further anodizing the porous alumina layer to grow the plurality of very small recessed portions.

In one embodiment, step (c) and step (d) are further performed after step (d).

A mold roll manufacturing method of the present invention includes the steps of: (e) providing a base roll and a flexible mold which has the above-described configuration; and (f) after step (e), fixing the flexible mold onto a perimeter surface of the base roll.

In one embodiment, the polymer film has knurled edges.

Advantageous Effects of Invention

According to the present invention, a method for easily manufacturing a flexible moth-eye mold is provided.

DESCRIPTION OF EMBODIMENTS

Hereinafter, a moth-eye mold and a method for manufacturing the moth-eye mold according to an embodiment of the present invention are described with reference to the drawings. Note that the present invention is not limited to embodiments which will be described below.

Figure 1:
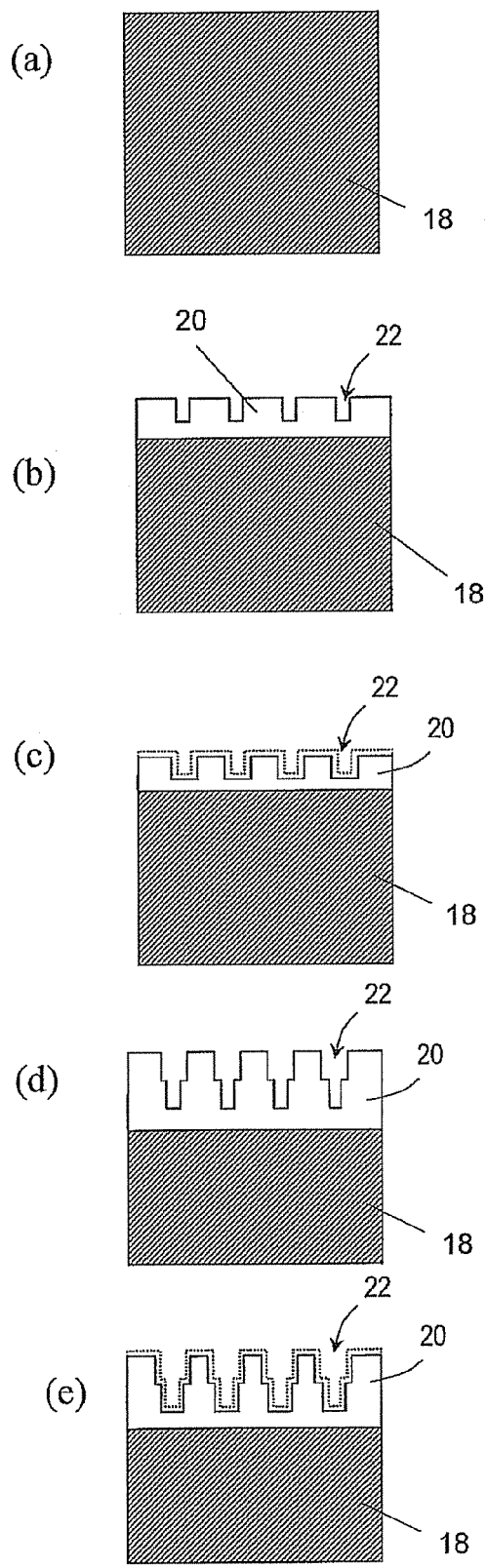
[FIG. 1] (*a*) to (*e*) are schematic cross-sectional views for illustrating a method for manufacturing a mold according to an embodiment of the present invention.

First, as shown in FIG. 1(a), a mold base is provided which has an aluminum layer (Al layer) over its surface. In FIGS. 1(a) to 1(e), for the sake of simplicity, only the Al layer 18 is shown. The Al layer 18 is formed by sputtering using, for example, an aluminum target with a purity of 99.99 mass % or higher. The thickness of the Al layer 18 is, for example, 1000 nm (1 μm). The thickness of the Al layer 18 is preferably not less than 100 nm for the purpose of obtaining an anodized alumina layer which has a surface structure for use as the moth-eye mold. In view of productivity, it is preferably not more than 3000 nm.

A mold manufacturing method of an embodiment of the present invention is characterized in using a mold base 10 shown in FIG. 2(a). As shown in FIG. 2(a), the mold base 10 includes a flexible polymer film 12, a curable resin layer 14 provided on a surface of the polymer film 12, and an aluminum layer 18 provided on the curable resin layer 14. The mold base 10 will be described in detail later.

Then, part of the Al layer 18 (surface portion) is anodized under predetermined conditions to form a porous alumina layer 20 which has micropores 22 as shown in FIG. 1(b). The size of the micropores 22, the formation density of the micropores 22, the depth of the micropores 22, etc., can be controlled according to the anodization conditions (e.g., the forming voltage, the type and concentration of the electrolytic solution, the duration of anodization, etc.). By controlling the level of the forming voltage, the regularity of the arrangement of the micropores 22 can be controlled. For example, a voltage at 80 V is applied for 40 seconds with the use of a 0.1 M oxalic aqueous solution at 20° C., whereby a porous alumina layer 20 can be obtained in which the distance between adjacent micropores is 190 nm and which has a thickness of about 100 nm.

Note that the first-formed porous alumina layer 20 may be removed when necessary. This is because the first-formed porous alumina layer 20 may include many defects due to the effects of impurities and the like. The thickness of the first-formed porous alumina layer 20 that is to be removed is preferably not less than 200 nm in view of reproducibility. In view of productivity, it is preferably not more than 2000 nm. As a matter of course, when necessary, the first-formed porous alumina layer 20 may be partially removed (e.g., to a certain depth from the surface). The removal of the porous alumina layer 20 can be realized by a known method, e.g., immersion in a phosphoric acid aqueous solution or a chromium-phosphoric acid mixture solution for a predetermined time period.

Then, the porous alumina layer 20 which have the micropores 22 is brought into contact with an alumina etchant to etch away a predetermined amount, such that the pore diameter of the micropores 22 is increased as shown in FIG. 1(c). Employing wet etching in this step enables substantially isotropic expansion of the pore wall and the barrier layer. The etching amount (i.e., the size and depth of the micropores 22) can be controlled by adjusting the type and concentration of the etching solution and the etching duration. The etching solution used herein may be an aqueous solution of an organic acid, such as phosphoric acid, formic acid, acetic acid, citric acid, or the like, of 10 mass %, or a chromium-phosphoric acid mixture solution.

Thereafter, the Al layer 18 is again partially anodized such that the micropores 22 are grown in the depth direction and the thickness of the porous alumina layer 20 is increased as shown in FIG. 1(d). Here, the growth of the micropores 22 starts at the bottom of the previously-formed micropores 22, so that the lateral surface of the micropores 22 has a stepped shape.

Thereafter, when necessary, the porous alumina layer 20 is brought into contact with an etchant of alumina to be further etched such that the diameter of the micropores 22 is further increased as shown in FIG. 1(e). The etching solution used in this step may preferably be the above-described etching solution. Practically, the same etching bath may be used.

In this way, by alternately repeating the anodization step (FIG. 1(b)) and the etching step (FIG. 1(c)) as described above, the porous alumina layer 20 provided with the micropores (very small recessed portions) 22, which has a desired uneven pattern, can be obtained. By appropriately determining the conditions for each of the anodization steps and the etching steps, the size, formation density, and depth of the micropores 22 as well as the stepped shape of the lateral surface of the micropores 22 can be controlled. To decrease the bottom portion of the micropores 22, the process is preferably ended with the anodization step (without performing any subsequent etching step). Thus, in a moth-eye structure which is formed using a resultant moth-eye mold that has the porous alumina layer 20 (a moth-eye mold 100 which will be described later (FIG. 2(b))), the raised portions can have small tips, so that the antireflection effects can be improved. The moth-eye structure preferably has a plurality of raised portions each of which has a two-dimensional size of not less than 10 nm and less than 500 nm when seen in a direction normal to the surface. Preferably, the distance between adjacent raised portions is not less than 30 nm and less than 600 nm.

In the example described herein, the anodization step and the etching step are alternately performed.

However, between the anodization step and the etching step, or between the etching step and the anodization step, a washing step and a drying step subsequent thereto may be performed. Also, in an interval between the anodization steps, the anodization conditions such as the forming voltage can be changed.

Figure 2:
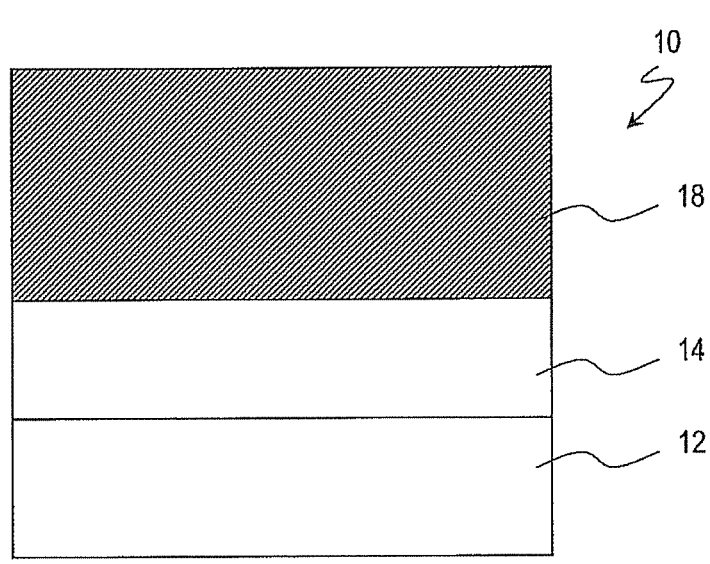
[FIG. 2] (*a*) is a schematic cross-sectional view of a mold base 10 which is for use in a mold manufacturing method according to an embodiment of the present invention. (*b*) is a schematic cross-sectional view of a moth-eye mold 100 which is manufactured using the mold base 10.
Figure 2:
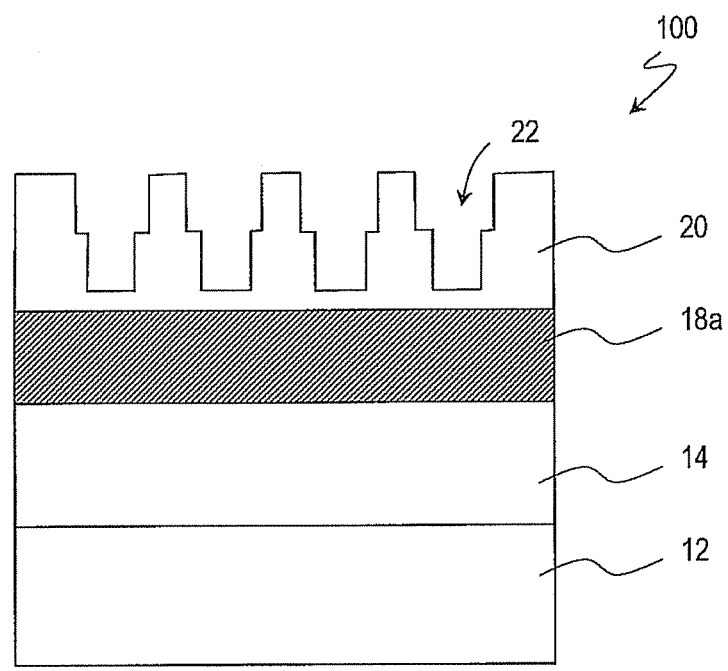

A mold base which is used in a method for manufacturing a mold according to an embodiment of the present invention has a structure which will be described below to improve the adhesion of the aluminum layer 18. Note that, herein, the adhesion between the polymer film and the aluminum layer refers not only to the inseparability of the aluminum layer in the case where the aluminum layer is directly formed on a surface of the polymer film but also to the inseparability of the aluminum layer in the case where another layer is interposed between the surface of the polymer film and the aluminum layer. Hereinafter, a mold base for use in a mold manufacturing method and a manufactured moth-eye mold according to an embodiment of the present invention are described with reference to FIG. 2. FIG. 2(a) is a schematic cross-sectional view of a mold base 10. FIG. 2(b) is a schematic cross-sectional view of a moth-eye mold 100 which is manufactured using the mold base 10.

The mold base 10 shown in FIG. 2(a) includes a polymer film 12, a curable resin layer 14 provided on a surface of the polymer film 12, and an aluminum layer 18 provided on the curable resin layer 14. Note that a conductive layer (preferably, a valve metal layer) may be provided as a backing in order to uniformly anodize the aluminum layer 18.

Examples of the flexible polymer film 12 used herein include a COP (cycloolefin polymer) film, a PEN (polyethylene naphthalate) film, a TAC (triacetyl cellulose) film, and a PET (polyethylene terephthalate) film.

As the material for the curable resin layer 14, a material which is used for a hard coat layer of a polarizing plate may preferably be used. For example, a thermosetting resin or a photocurable resin may be used. In view of productivity, a photocurable resin (e.g., UV-curable resin) is preferred. In view of adhesion, the UV-curable resin preferably contains an acrylic resin. As will be described later with Inventive Example 1 and Comparative Example 1, the curable resin layer 14 serves to improve the adhesion between the polymer film 12 and the aluminum layer 18.

The aluminum layer 18 may be formed using a known method (e.g., electron beam deposition or sputtering). Here, the aluminum layer 18 having a thickness of about 1 µm is preferably formed through a plurality of separate cycles rather than formed at once in one cycle. Specifically, it is preferred to repeat the cycle of depositing aluminum to a certain thickness before an intermission of a certain time period and resuming the deposition after the intermission till the aluminum layer 18 having a predetermined thickness (e.g., 1 µm) is obtained, rather than to continuously deposit aluminum to the predetermined thickness. For example, it is preferred that the aluminum layer 18 having a thickness of about 1 µm is obtained by forming 20 aluminum layers each of which has a thickness of 50 nm in such a manner that every formation of the 50 nm thick aluminum layer is followed by an intermission. In this way, the deposition of aluminum is carried out in a plurality of separate cycles, whereby the quality of the finally-obtained aluminum layer 18 (e.g., the chemical resistance or adhesion) can be improved. This is probably because continuous deposition of aluminum increases the temperature of a base (a base having a surface on which the aluminum layer is to be formed), and as a result, the distribution of thermal stress in the aluminum layer 18 becomes nonuniform so that the film quality deteriorates.

A porous alumina layer 20 is formed using the mold base 10 shown in FIG. 2(a) according to the method which has been described with reference to FIGS. 1(a) to 1(e), whereby the moth-eye mold 100 shown in FIG. 2(b) is obtained. The moth-eye mold 100 includes the flexible polymer film 12, the curable resin layer 14 provided on a surface of the polymer film 12, an aluminum layer 18a provided on the curable resin layer 14, and the porous alumina layer 20 provided on a surface of the aluminum layer 18a. Note that, when the aluminum layer 18 of the mold base 10 is entirely anodized, the resultant moth-eye mold does not include the aluminum layer 18a.

According to the manufacturing method which has been described with reference to FIGS. 1(a) to 1(e), a mold is manufactured by anodizing the aluminum layer 18 provided on the polymer film 12, and therefore, the method does not include the step of transferring the uneven structure of the porous alumina film. Thus, the flexible moth-eye mold 100 (hereinafter, also referred to as "flexible mold 100") can be easily manufactured.

Figure 3:
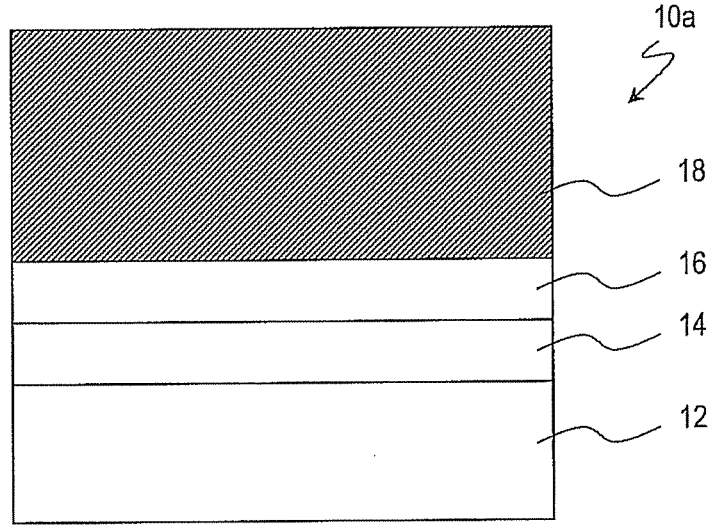
[FIG. 3] (*a*) is a schematic cross-sectional view of a mold base 10*a* which is for use in a mold manufacturing method according to an embodiment of the present invention. (*b*) is a schematic cross-sectional view of a moth-eye mold 100*a* which is manufactured using the mold base 10*a*.
Figure 3:
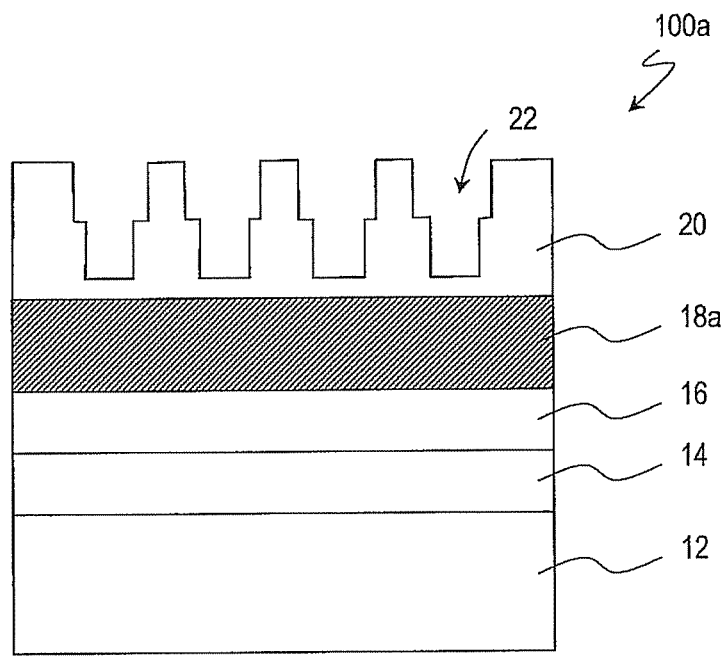

Next, a mold base 10a and a flexible mold 100a according to another embodiment are described with reference to FIG. 3.

As shown in FIG. 3(a), the mold base 10a includes a polymer film 12, a curable resin layer 14 provided on a surface of the polymer film 12, an inorganic underlayer 16 provided on the curable resin layer 14, and an aluminum layer 18 provided on the inorganic underlayer 16. Note that, when a conductive layer (preferably, a valve metal layer) is provided as a backing in order to uniformly anodize the aluminum layer 18, the conductive layer is preferably provided between the buffer layer 16 and the aluminum layer 18.

The inorganic underlayer 16 serves to improve the adhesion between the curable resin layer 14 and the aluminum layer 18. In view of adhesion, the inorganic underlayer 16 is preferably made of an inorganic oxide or an inorganic nitride. When an inorganic oxide is used, for example, the inorganic underlayer 16 is preferably a silicon oxide layer or a titanium oxide layer. When an inorganic nitride is used, for example, the inorganic underlayer 16 is preferably a silicon nitride layer. The inorganic underlayer 16 is expected to have the effect of preventing emission of outgas from the polymer film 12.

A porous alumina layer 20 is formed using the mold base 10a shown in FIG. 3(a) according to the method which has been described with reference to FIGS. 1(a) to 1(e), whereby the flexible mold 100a shown in FIG. 3(b) is obtained. The flexible mold 100a includes the polymer film 12, the curable resin layer 14 provided on a surface of the polymer film 12, the inorganic underlayer 16 provided on the curable resin layer 14, an aluminum layer 18a provided on a surface of the inorganic underlayer 16, and the porous alumina layer 20 provided on a surface of the aluminum layer 18a.

Figure 4:
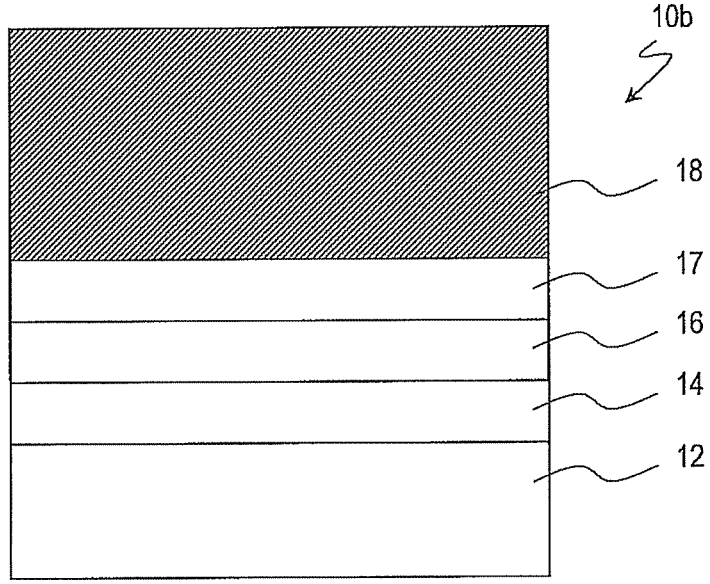
[FIG. 4] (a) is a schematic cross-sectional view of a mold base 10b which is for use in a mold manufacturing method according to an embodiment of the present invention. (b) is a schematic cross-sectional view of a moth-eye mold 100b which is manufactured using the mold base 10b.
Figure 4:
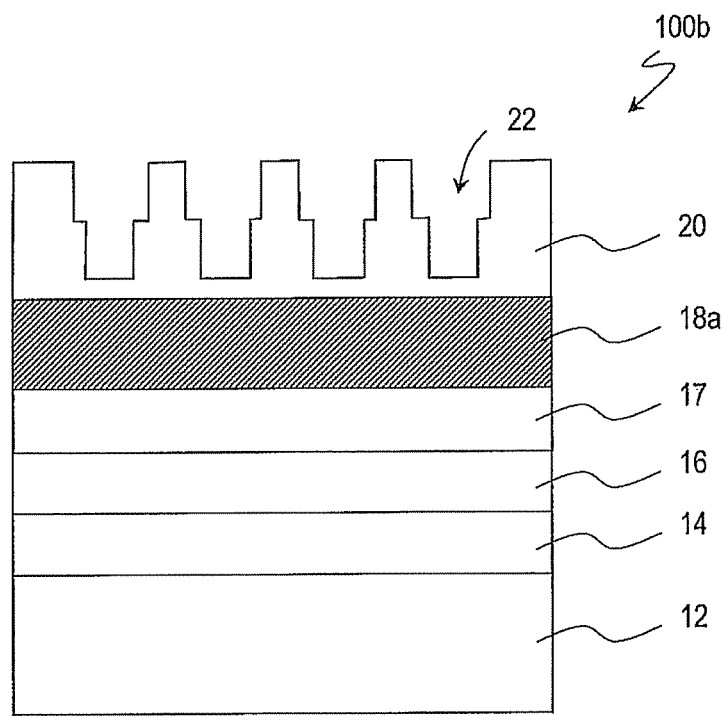

Next, a mold base 10b and a flexible mold 100b according to another embodiment are described with reference to FIG. 4.

The mold base 10b is different from the mold base 10a (FIG. 3(a)) in that a buffer layer 17 is further provided on the inorganic underlayer 16 (FIG. 4(a)). As shown in FIG. 4(a), the mold base 10b includes the polymer film 12, the curable resin layer 14 provided on a surface of the polymer film 12, the inorganic underlayer 16 provided on the curable resin layer 14, the buffer layer 17 which is provided on the inorganic underlayer 16 and which contains aluminum, and the aluminum layer 18 provided on a surface of the buffer layer 17. Note that, when a conductive layer (preferably, a valve metal layer) is provided as a backing in order to uniformly anodize the aluminum layer 18, the conductive layer is preferably provided between the inorganic underlayer 16 and the buffer layer 17 or between the buffer layer 17 and the aluminum layer 18.

The buffer layer 17 serves to improve the adhesion between the inorganic underlayer 16 and the aluminum layer 18. The buffer layer 17 is made of a material which has excellent acid resistance to protect the inorganic underlayer 16 from acid.

The buffer layer 17 preferably contains aluminum and either of oxygen or nitrogen. The buffer layer 17 preferably has such a profile that the aluminum content is higher in a portion which is closer to the aluminum layer 18 than in another portion which is closer to the inorganic underlayer 16, although the oxygen or nitrogen content may be uniform. This is because the property values, such as the thermal expansion coefficient, exhibit excellent conformity. The thickness of the buffer layer 17 is preferably not less than 40 nm and, more preferably, not less than 100 nm. The thickness of the buffer layer 17 is preferably not more than 500 nm and, more preferably, not more than 200 nm. If the thickness of the buffer layer 17 is less than 40 nm, it is difficult to sufficiently protect the inorganic underlayer 16 from a treatment solution permeating from the aluminum layer 18 side (the electrolytic solution in the anodization step and/or the etching solution in the etching step), i.e., the effects of provision of the buffer layer 17 are not sufficiently produced. If the thickness of the buffer layer 17 is more than 500 nm, the time required for formation of the buffer layer 17 will be unduly long.

The profile of the aluminum content in the buffer layer 17 along the thickness direction may vary stepwise or may continuously vary. For example, when the buffer layer 17 is formed of aluminum and oxygen, a plurality of aluminum oxide layers which have gradually decreasing oxygen contents are formed, and then, the aluminum layer 18 is formed on the uppermost aluminum oxide layer. This process also applies to a case where the buffer layer 17 is formed of aluminum and nitrogen.

The inorganic underlayer 16 may be made of the same material as that which has been previously described for the inorganic underlayer 16 of the mold base 10a (FIG. 3(a)). When the inorganic underlayer 16 is made of an inorganic oxide or inorganic nitride, the thermal expansion coefficient of the inorganic underlayer 16 is preferably adapted to the thermal expansion coefficients of adjacent layers, such as the curable resin layer 14 and the buffer layer 17, by adding an impurity to the inorganic oxide or inorganic nitride. For example, when a silicon oxide layer is used, the thermal expansion coefficient can be increased by adding germanium (Ge), phosphorus (P), or boron (B). When 5 mass % Ge is added to the silicon oxide, for example, the thermal expansion coefficient is about $2.8 \times 10^{-6}/°$ C., which is about three times that obtained when Ge is not added.

The inorganic underlayer 16 may be formed by sputtering as described above. For example, the inorganic underlayer 16 may be formed by DC reactive sputtering or RF sputtering. In view of adhesion, RF sputtering is more preferable than DC reactive sputtering. When the film is formed by RF sputtering, a mixing zone in which the resin used as the material for the curable resin layer 14 and $SiO_2$ are mixed together is formed at the interface between the underlying curable resin layer 14 and the inorganic underlayer 16. Probably, this improves the adhesion.

The thickness of the inorganic underlayer 16 is preferably not more than 500 nm and, more preferably, not more than 300 nm. If the thickness of the inorganic underlayer 16 is large, the time required for formation of the inorganic underlayer 16 will be unduly long. If the thickness of the inorganic underlayer 16 is large, a crack may be formed in the inorganic underlayer 16 when the mold base is bent. If the thickness of the inorganic underlayer 16 is more than 500 nm, the adhesion of the aluminum layer 18 may deteriorate due to thermal stress (shear stress) which is attributed to the difference in thermal expansion coefficient between the inorganic underlayer 16 and the aluminum layer 18.

In view of the adhesion of the aluminum layer 18, the thickness of the inorganic underlayer 16 is preferably not less than 50 nm. In the case where the film is formed by sputtering, the adhesion may probably deteriorate if the number of pinholes formed in the film is equal to or greater than a certain number. Therefore, the inorganic underlayer 16 preferably has a smaller number of pinholes. In view of preventing formation of pinholes, the thickness of the inorganic underlayer 16 is preferably not less than 70 nm. The present inventor prepared seven samples, in which the $SiO_2$ layers were formed by RF sputtering to have different thicknesses, 15 nm, 30 nm, 50 nm, 70 nm, 100 nm, 150 nm, and 300 nm, and found that the adhesion was sufficient when the thickness of the $SiO_2$ layer was not less than 50 nm, and that formation of pinholes was prevented when the thickness of the $SiO_2$ layer was not less than 70 nm.

A porous alumina layer 20 is formed using the mold base 10b shown in FIG. 4(a) according to the method which has been described with reference to FIGS. 1(a) to 1(e), whereby the flexible mold 100b shown in FIG. 4(b) is obtained. The flexible mold 100b includes the polymer film 12, the curable resin layer 14 provided on a surface of the polymer film 12, the inorganic underlayer 16 provided on the curable resin layer 14, the buffer layer 17 provided on the inorganic underlayer 16, an aluminum layer 18a provided on a surface of the buffer layer 17, and the porous alumina layer 20 provided on a surface of the aluminum layer 18a.

Figure 5:
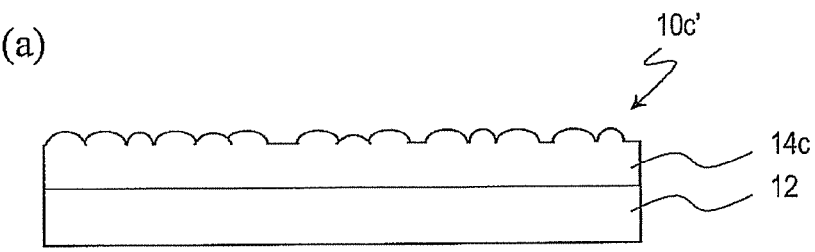
[FIG. 5] (a) to (c) are schematic cross-sectional views for illustrating a method for manufacturing a mold 1000 according to an embodiment of the present invention.
Figure 5:
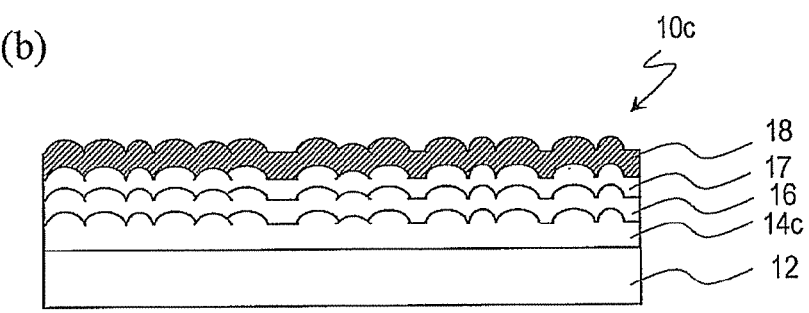
Figure 5:
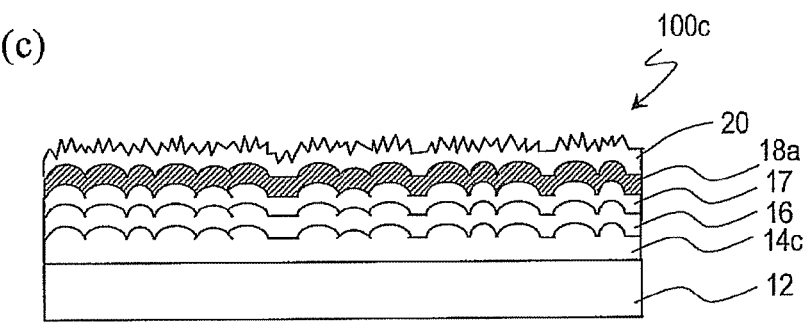

Next, a mold base 10c and a flexible mold 100 according to another embodiment are described with reference to FIG. 5. The mold base 100 and the flexible mold 100c have an uneven structure which performs an antiglare function (Patent Documents 1, 2, and 4).

Hereinafter, a method for manufacturing the moth-eye mold 100c is described with reference to FIGS. 5(a) to 5(c).

As shown in FIG. 5(a), a base film 10c' is prepared which includes a polymer film 12 and a curable resin layer 14c provided on the polymer film 12. As shown in FIG. 5(a), the surface of the curable resin layer 14c has an uneven structure which performs an antiglare function. The surface of the curable resin layer 14c has raised portions whose two-dimensional size is not less than 1 μm and less than 100 μm. The base film 10c' may be obtained by, for example, applying a curable resin composition which contains a curable resin and microparticles over the polymer film 12 that is made of PET, and curing the applied resin composition. The curable resin may be a material which contains the above-described thermosetting resin or photocurable resin that is used for the curable resin layer 14 of the mold base 10. For example, an acrylic resin may be used. The microparticles used herein may be silica particles whose average particle size is not less than 1 μm and not more than 20 μm.

Then, the inorganic underlayer 16 is formed on the curable resin layer 14c of the base film 10c', and the buffer layer 17 is formed on the inorganic underlayer 16. Thereafter, aluminum is deposited over the surface of the buffer layer 17 to form the aluminum layer 18, whereby the mold base 10c is obtained as shown in FIG. 5(b). The surface of the aluminum layer 18 has an uneven structure which is the same as the uneven structure of the surface of the curable resin layer 14c.

Then, anodization and etching are repeatedly performed on the mold base 10c according to a method which is similar to the method that has been described with reference to FIGS. 1(a) to 1(e), whereby the flexible moth-eye mold 100c which includes the porous alumina layer 20 that has an uneven structure which performs an antiglare function as shown in FIG. 5(c) is obtained. The flexible mold 100c may be used as a mold that is used for formation of an antireflection film in which a moth-eye structure is superposed over an uneven structure that performs an antiglare function. Note that the inorganic underlayer 16 and the buffer layer 17 may be omitted from the flexible mold 100c.

Hereinafter, a moth-eye mold and a manufacturing method thereof according to an embodiment of the present invention are described in more detail, with inventive examples and comparative examples.

INVENTIVE EXAMPLE 1, COMPARATIVE EXAMPLE 1

The mold base of Inventive Example 1 is a mold base which is used for manufacturing a clear-type moth-eye mold and has the same structure as that of the mold base 10 shown in FIG. 2(a). Here, the clear-type moth-eye mold means a moth-eye mold that does not have an uneven structure which performs an antiglare function. The mold base of Inventive Example 1 was manufactured as described below.

The polymer film 12 used herein was a PET film (manufactured by KIMOTO CO., LTD., 188 μm thick).

A 20 μm thick curable resin layer (acrylic resin layer) 14 and a 1 μm thick aluminum layer 18 were directly formed on the polymer film 12. The aluminum layer 18 was formed by electron beam deposition.

Figure 6:
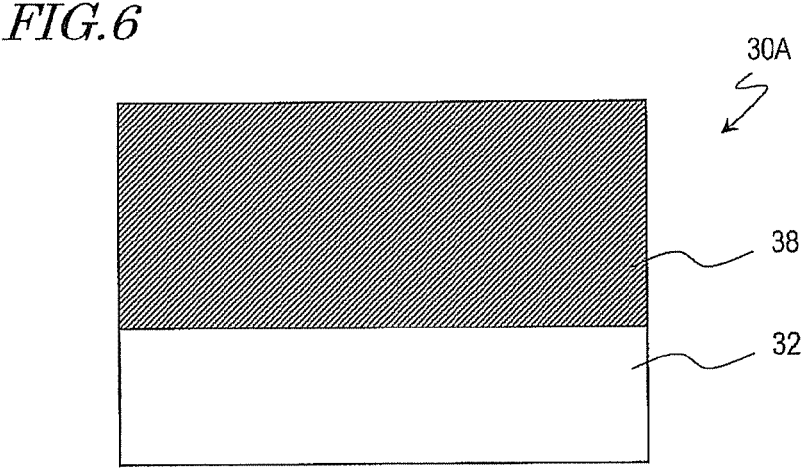
[FIG. 6] A schematic cross-sectional view of a mold base 30 Å of Comparative Example 1.

The mold base 30A of Comparative Example 1 was manufactured according to the above-described manufacturing method of the mold base 10 of Inventive Example 1 except that an aluminum layer 38 was formed on a surface of a polymer film 32, without forming the curable resin layer, as shown in FIG. 6.

The manufacturing process which has been described with reference to FIGS. 1(a) to 1(e) was performed on the mold base 10 of Inventive Example 1. (The anodization conditions were treatment solution: oxalic acid (0.3 wt %), temperature: 5° C., voltage: 80 V, and treatment duration: 1 min. The etching conditions were phosphoric acid (1 mol/L (liter)), treatment temperature: 30° C., and treatment duration: 25 min.) The anodization step and the etching step were alternately performed through 5 cycles (including 5 cycles of the anodization step and 4 cycles of the etching step).

Figure 7:
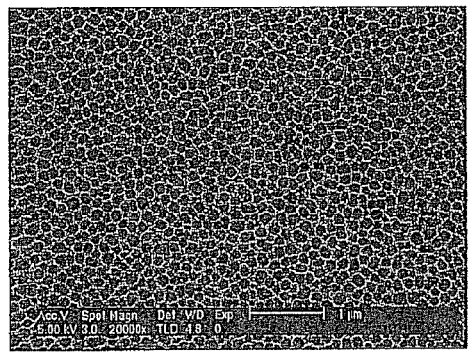
[FIG. 7] A SEM image of a surface of a porous alumina layer of a mold base 10 of Inventive Example 1.

FIG. 7 shows a SEM image of a surface of the mold base 10 of Inventive Example 1 which was taken after the anodization step and the etching step. As shown in FIG. 7, a porous alumina layer with an inverted moth-eye structure was obtained when the mold base 10 of Inventive Example 1 was used.

On the other hand, the anodization step and the etching step were alternately performed on the mold base 30A of Comparative Example 1 under the same conditions as those described above. In the third etching cycle, the aluminum layer 38 was entirely peeled off in the etchant. Therefore, a porous alumina layer with an inverted moth-eye structure was not formed from the mold base 30A of Comparative Example 1. The aluminum layer 38 was peeled off probably because the mold base 30A of Comparative Example 1 did not include a curable resin layer, and hence, the adhesion of the aluminum layer 38 was poor.

INVENTIVE EXAMPLE 2 AND COMPARATIVE EXAMPLE 2

A mold base of Inventive Example 2 is configured to manufacture a clear-type moth-eye mold as is the mold base of Inventive Example 1, and has the same structure as that of the mold base 10b shown in FIG. 4(a). The mold base of Inventive Example 2 was manufactured as described below.

The polymer film 12 used herein was a 1 m×1.6 m PET film (manufactured by KIMOTO CO., LTD., 180 μm thick).

A 20 μm thick curable resin layer (acrylic resin layer) 14, a 60-70 nm thick inorganic underlayer ($SiO_2$ layer) 16, a 40 nm thick buffer layer 17 (containing aluminum and oxygen), and a 1 μm thick aluminum layer 18 were formed directly over the polymer film 12. All these layers were formed by sputtering. The sputtering conditions were as follows. The vacuum degree of the background: $1 \times 10^{-5}$ Torr (0.0013 Pa), the atmosphere gas: Ar, the vacuum degree during sputtering: $1 \times 10^{-3}$ Torr (0.13 Pa), the Al target purity: 99.999 mass %.

Here, as the buffer layer 17, a buffer layer including a plurality of aluminum oxide layers of different oxygen contents was formed. The plurality of aluminum oxide layers were formed to have such a profile that an aluminum oxide layer which was closer to the $SiO_2$ layer 16 had a higher oxygen content, in other words, such a profile that the aluminum content was higher in a portion which was closer to the aluminum layer 18 than in another portion which was closer to the $SiO_2$ layer 16. Note that the buffer layer 17 may be formed by a single aluminum oxide layer.

When the buffer layer 17 was formed by two aluminum oxide layers, the oxygen content of one of the aluminum oxide layers which was closer to the $SiO_2$ layer 16 was not less than 30 at % and not more than 60 at %, the oxygen content of the other aluminum oxide layer which was closer to the aluminum layer 18 was not less than 5 at % and not more than 30 at %, and the oxygen contents of the two aluminum oxide layers simultaneously met these conditions.

When the buffer layer 17 was formed by three aluminum oxide layers, the oxygen content of one of the aluminum oxide layers which was closer to the $SiO_2$ layer 16 was not less than 35 at % and not more than 60 at %, the oxygen content of the middle aluminum oxide layer was not less than 20 at % and not more than 35 at %, the oxygen content of the other aluminum oxide layer which was closer to the aluminum layer 18 was not less than 5 at % and not more than 20 at %, and the oxygen contents of the three aluminum oxide layers simultaneously met these conditions. As a matter of course, the buffer layer 17 may be formed by four or more aluminum oxide layers.

The buffer layer 17 may be formed by, for example, using any of the three methods (1) to (3) described below.

(1) The film is formed by reactive sputtering with the use of a mixture gas of Ar gas and $O_2$ gas and an Al target which contains the oxygen element. Here, the oxygen content in the target is preferably not less than 1 at % and not more than 40 at %. If the oxygen content in the target is less than 1 at %, the effects of oxygen contained in the target are insufficient. If the oxygen content in the target is more than 40 at %, the $O_2$ gas is unnecessary.

(2) The film is formed by reactive sputtering with the use of a pure Ar gas as the sputtering gas and an Al target which contains the oxygen element. Here, the oxygen content in the target is preferably not less than 5 at % and not more than 60 at %. If the oxygen content in the target is less than 5 at %, the amount of oxygen contained in the formed aluminum oxide layer may be insufficient. If the oxygen content in the target is more than 60 at %, the content of the oxygen element in the formed aluminum oxide layer may be excessively high. If the content of the oxygen element in the aluminum oxide layer which is closer to the inorganic underlayer is more than 60 at %, the adhesion between the inorganic underlayer ($SiO_2$) and the aluminum oxide layer may deteriorate.

(3) The film is formed by reactive sputtering with the use of a pure Al target. Here, the flow rate ratio of the Ar gas and the $O_2$ gas of the mixture gas used in the sputtering is, approximately, more than 2:0 and not more than 2:1. If the flow rate ratio of the Ar gas and the $O_2$ gas is more than 2:1, the content of the oxygen element in the formed aluminum oxide layer may be excessively high.

In the mold base 10b of Inventive Example 2, the buffer layer 17 including two aluminum oxide layers was formed using the above method (3). The oxygen contents of the aluminum oxide layers were 5 at % and 48 at %, which met the above conditions. The oxygen content was measured by X-ray photoelectron spectroscopy (ESCA).

The thermal expansion coefficients of the inorganic underlayer 16, the buffer layer 17, and the aluminum layer 18 of the mold base 10b of Inventive Example 2 (in the range from room temperature to 100° C.) are as follows:

Inorganic underlayer 16: $SiO_2$: $1.0 \times 10^{-6}$/° C.
Buffer layer 17: $Al_2O_3$: $6.9 \times 10^{-6}$/° C.
Aluminum layer 18: Al: $23 \times 10^{-6}$/° C.

Here, in the mold base 10b of Inventive Example 2, the oxygen content of the buffer layer 17 is lower than that of $Al_2O_3$ (although accurate measurement is difficult). Therefore, the thermal expansion coefficient of the buffer layer 17 is larger than that of $Al_2O_3$ ($6.9 \times 10^{-6}$/° C.) and is smaller than that of Al ($23 \times 10^{-6}$/° C.). Thus, by providing the buffer layer 17, the adhesion to the aluminum layer 18 is improved.

Note that increasing the thermal expansion coefficient of the inorganic underlayer 16 that is made of $SiO_2$ so as to conform to the thermal expansion coefficients of the other layers can be realized by, for example, doping $SiO_2$ with Ge at about 5 mass % to 10 mass %.

Figure 8:
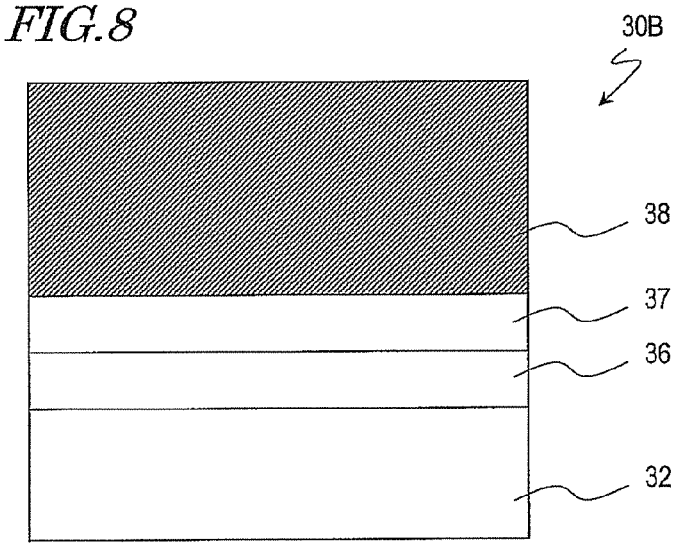
[FIG. 8] A schematic cross-sectional view of a mold base 30B of Comparative Example 2.

The mold base 30B of Comparative Example 2, shown in FIG. 8, was manufactured according to the manufacturing method of the mold base 10b of Inventive Example 2 described above, except that an inorganic underlayer ($SiO_2$ layer) 36 was formed on the surface of the polymer film 32 as in the mold base 10b of Inventive Example 2 without forming the curable resin layer, and a buffer layer 37 was formed on the inorganic underlayer 36 before the formation of the aluminum layer 38 on the surface of the buffer layer 37.

The obtained mold bases were evaluated in terms of adhesion between the polymer film and the aluminum layer by a so-called peeling test (crosscut test) as will be described below.

In each of the mold bases, the layers formed on the polymer film were cut into a matrix of 5×5 squares, each having a size of 1 cm×1 cm, using a utility knife, with the incision reaching the surface of the polymer film. An adhesive tape (Scotch tape BH-24 manufactured by Sumitomo 3M Limited) was tightly placed onto the aluminum layer so as to cover a region of the cut squares and then peeled off from the aluminum layer. The number of squares (including the aluminum layer 18, 38, the curable resin layer 14, the inorganic underlayer 16, 36 and/or the buffer layer 17, 37) which were removed together with the peeled adhesive tape was counted for evaluation. The results of the evaluation are shown in TABLE 1. ○ means that the number of removed squares was not less than 1 and less than 5. X means that the number of removed squares was not less than 10. The peeling test was carried out on the following samples in different phases:

"INITIAL": Samples immediately after manufacturing the above mold bases;
"ETCHING": Samples immediately after the etching with phosphoric acid (1 mol/L) at 30° C. for 30 min.

TABLE 1

|  | INVENTIVE EXAMPLE 2 | COMPARATIVE EXAMPLE 2 |
| --- | --- | --- |
| INITIAL | ○ | X |
| ETCHING | ○ | X |

As clearly seen from the results of TABLE 1, as for the mold base 30B of Comparative Example 2, the adhesion was "X" in both phases. On the other hand, when the mold base 10b of Inventive Example 2 was used, the adhesion between the polymer film 12 and the aluminum layer 18 was improved to be "○" in both phases.

As for the mold base 30B of Comparative Example 2, the number of removed squares was large after it was immersed in the etchant. It is inferred that, when immersed in the etchant, the inorganic underlayer 36 ($SiO_2$) was chemically damaged by the etchant (phosphoric acid) that entered the gap between the polymer film 32 and the inorganic underlayer 36.

Figure 9:
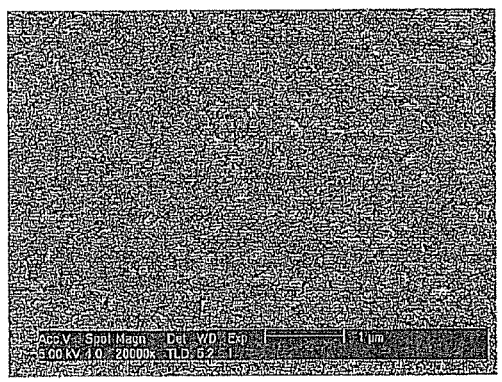
[FIGS. 9] (a) and (b) are SEM images of a surface of an aluminum layer of a mold base 10b of Inventive Example 2. (a) is a SEM image taken immediately after formation of the aluminum layer. (b) is a SEM image taken after immersion in a phosphoric acid aqueous solution.
Figure 9:
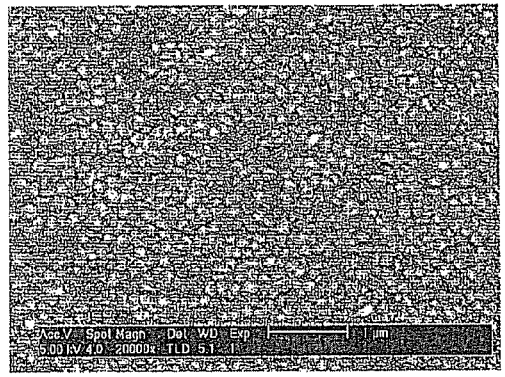
Figure 10:
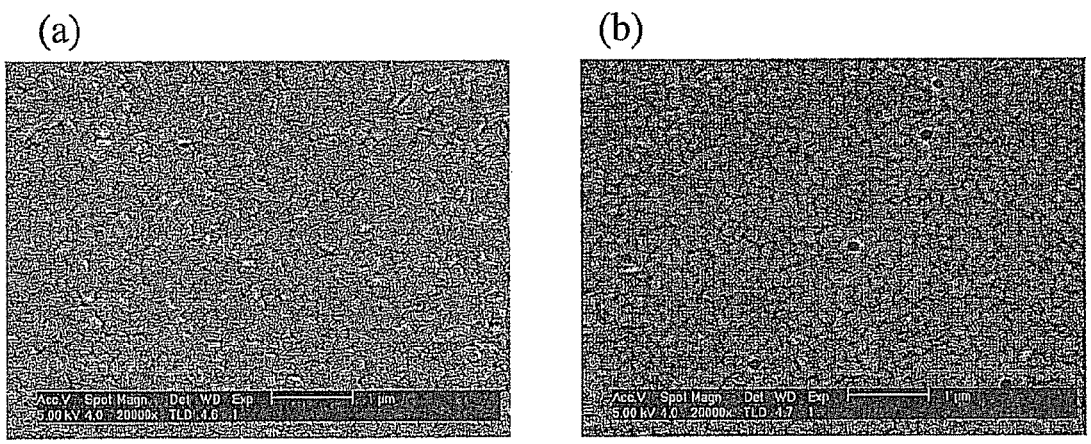
[FIGS. 10] (a) and (b) are SEM images of a surface of an aluminum layer of a mold base 30B of Comparative Example 2. (a) is a SEM image taken immediately after formation of the aluminum layer. (b) is a SEM image taken after immersion in a phosphoric acid aqueous solution.

FIGS. 9(a) and 9(b) show SEM images of the surface of the aluminum layer of the mold base 10b of Inventive Example 2. FIGS. 10(a) and 10(b) show SEM images of the surface of the aluminum layer of the mold base 30B of Comparative Example 2. FIG. 9(a) and FIG. 10(a) show the SEM images which were taken immediately after the formation of the aluminum layer. FIG. 9(b) and FIG. 10(b) show the SEM images which were taken after immersion in the phosphoric acid aqueous solution.

Black spots which are seen in FIG. 10(b) are pits (recesses). It is inferred that the aluminum layer immediately after formation had small pits, although they are difficult to identify in the image of FIG. 10(a). It is inferred that, in the mold base 30E of Comparative Example 2, the pits were enlarged by immersion in the phosphoric acid aqueous solution. It is inferred that, in the mold base 30B of Comparative Example 2, the phosphoric acid aqueous solution entered at the pits formed in the aluminum layer, so that the adhesion deteriorated.

On the other hand, as clearly seen from FIGS. 9(a) and 9(b), the aluminum layer of the mold base 10b of Inventive Example 2 did not have pits (recesses). It is inferred that, in the mold base 10b of Inventive Example 2, unlike the mold base 30B of Comparative Example 2, entry of the treatment solution at the pits was prevented, and therefore the mold base 10b exhibited excellent adhesion.

A mold base was manufactured according to the manufacturing method of the mold base 10b of Inventive Example 2 such that the curable resin layer was formed on both surfaces of the polymer film 12, and the adhesion in the manufactured mold base was examined. The curable resin layer was formed on both surfaces of the polymer film 12 to examine the effects of outgas from the rear surface. In this case also, the above-described peeling test showed that the adhesion was "○" in both phases.

The mold base 10b of Inventive Example 2 includes the inorganic underlayer 16 and the buffer layer 17 and therefore has better adhesion than the previously-described mold base 10 of Inventive Example 1.

INVENTIVE EXAMPLE 3

Inventive Example 3 used a mold base that has a surface with an uneven structure which performs an antiglare function, whereas Inventive Examples 1 and 2 used a mold base which is used for manufacturing a clear-type moth-eye mold.

The mold base of Inventive Example 3 has the same structure as that of the mold base 10c shown in FIG. 5(b), i.e., includes the polymer film 12, the curable resin layer 14c provided on the surface of the polymer film 12, the inorganic underlayer 16 provided on the curable resin layer 14c, the buffer layer 17 provided on the inorganic underlayer 16, and the aluminum layer 18 provided on the surface of the buffer layer 17.

The mold base of Inventive Example 3 was manufactured as described below. A base film was prepared which included a polymer film 12 formed by a PET film (manufactured by KIMOTO CO., LTD., 188 μm thick) and a curable resin layer 14c provided on the polymer film 12. The curable resin layer 14c had an uneven structure which performs an antiglare function in its surface. Then, a 70 nm thick $SiO_2$ layer was formed as the inorganic underlayer 16 on the curable resin layer 14c. Then, a 150 nm thick aluminum oxide layer was formed as the buffer layer 17 on a surface of the $SiO_2$ layer 16. Thereafter, a 1 μm thick aluminum layer 18 was formed on a surface of the aluminum oxide layer 17, whereby the mold base 10c was obtained. Note that the aluminum layer 18 was obtained by forming 5 aluminum layers each of which had a thickness of 200 nm in such a manner that every formation of the 200 nm thick aluminum layer was followed by an intermission.

A peeling test was carried out on a sample mold base with an inverted moth-eye structure which was manufactured through the manufacturing process described with reference to FIGS. 1(a) to 1(e), in addition to the "INITIAL" samples and "ETCHING" samples which have been previously described. The anodization conditions and etching conditions were the same as those of Inventive Example 1.

The mold base 10c of Inventive Example 3 exhibited the evaluation result of "○" in both experiments, which means excellent adhesion.

The same experiment was conducted on a mold base sample which had the same structure as that of the mold base 10c of Inventive Example 3 except that a TAC film was included in place of the PET film, and this mold base sample exhibited excellent adhesion.

For the base in which an uneven structure that performs an antiglare function is formed in the PET film and the TAC film, a base which is used for manufacturing a polarizing plate can be used. Therefore, advantageously, the base is readily available.

Figure 11:
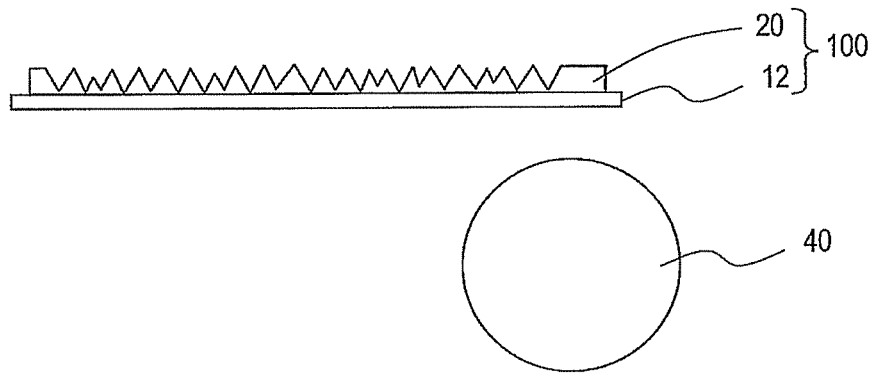
[FIG. 11] (a) to (c) are schematic cross-sectional views for illustrating a method for manufacturing a mold roll 200.
Figure 11:
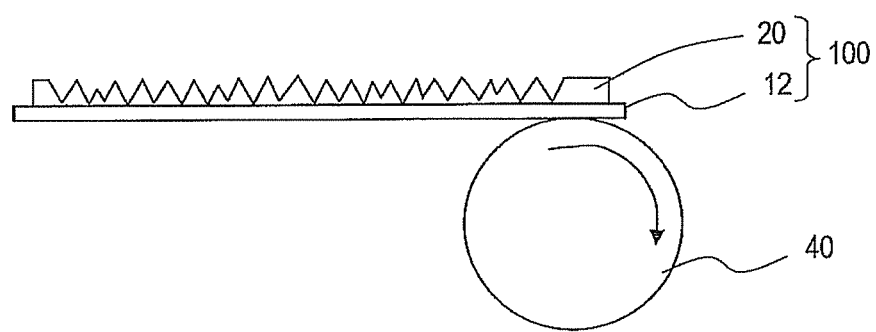
Figure 11:
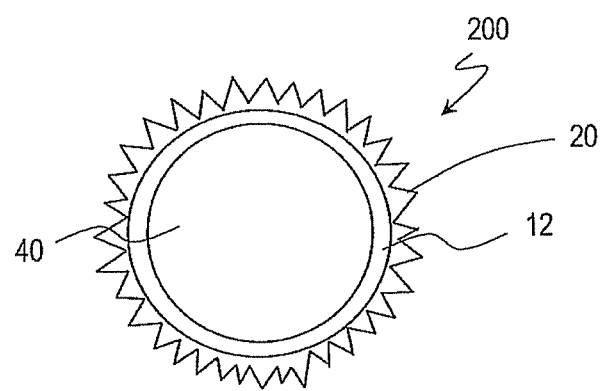

The flexible mold 100 (FIG. 2(b)) according to an embodiment of the present invention includes a flexible film as the polymer film 12 and therefore can be deformed into the form of a roll. By fixing the flexible mold 100 onto the perimeter surface of a base which is in the form of a roll (base roll), a moth-eye mold in the form of a roll can be obtained. A method for manufacturing a moth-eye mold 200 in the form of a roll (hereinafter, also referred to as "mold roll 200") with the use of the flexible mold 100 is described with reference to FIG. 11.

First, as shown in FIG. 11(a), the flexible mold 100 and a base roll 40 are prepared. In FIG. 11(a), for the sake of simplicity, as for the flexible mold 100, only the polymer film 12 and the porous alumina layer 20 are shown. The base roll 40 is made of, for example, stainless steel.

Next, as shown in FIG. 11(b), the flexible mold 100 is fixed onto the perimeter surface of the base roll 40. Here, for example, an adhesive layer may be formed over the rear surface of the flexible mold 100 before the flexible mold 100 is directly attached onto the base roll 40. The adhesive layer may be a low-tack adhesive layer that is re-adherable many times. Alternatively, a double-sided tape may be used as the adhesive layer. Alternatively, the adhesive layer may be formed over the base roll 40 before the flexible mold 100 is attached onto the base roll 40. Alternatively, an electrostatic adsorption structure may be provided to the base roll 40 for fixing the flexible mold 100. The flexible mold 100 is preferably attached to the base roll 40 without forming an air layer between the flexible mold 100 and the base roll 40, and without forming wrinkles or twists. Among the above fixing methods, fixing by means of a low-tack adhesive layer or fixing by means of an electrostatic adsorption structure provided to the base roll 40 is advantageous in that reworking is easily possible. Note that, since the flexible mold 100 is wound around the perimeter surface of the base roll 40, there is a seam in the perimeter surface. The flexible mold 100 may be fixed only at the seam, without applying an adhesive agent or the like to the other part than the seam.

In this way, the moth-eye mold roll 200 shown in FIG. 11(c) can be obtained. According to the method illustrated in FIGS. 11(a) to 11(c), the moth-eye mold roll can be manufactured without the transfer step of the uneven structure of the porous alumina layer.

The moth-eye mold roll may be manufactured by repeatedly performing anodization and etching on an aluminum base which is in the form of a roll (aluminum pipe). However, the moth-eye mold roll 200 is more advantageous than the mold manufactured with the use of an aluminum pipe. For example, in the case where the porous alumina film surface itself is used as the mold, the porous alumina film may be worn down. In this case, the mold manufactured with the use of an aluminum pipe needs to be entirely replaced. However, the moth-eye mold roll 200 only needs replacement of the flexible mold 100. Therefore, the moth-eye mold roll 200 is advantageous in terms of cost reduction.

The moth-eye mold roll 200 is also advantageous in that the polymer film 12 of the flexible mold 100 may be realized by a general-purpose film and that formation of the aluminum layer may be realized by using a film formation apparatus which is applicable to various purposes, without the necessity of a special-purpose apparatus. The flexible mold 100 which is for use in the moth-eye mold roll 200 can be manufactured by performing anodization and etching through a batch process. In the case where the circularity or straightness of the roll is a critical parameter, the accuracy can advantageously be higher in a mold roll manufactured by fixing a flexible mold onto a base roll that is made of stainless steel (e.g., SUS in the JIS) than in a mold roll manufactured with the use of an aluminum pipe.

Figure 12:
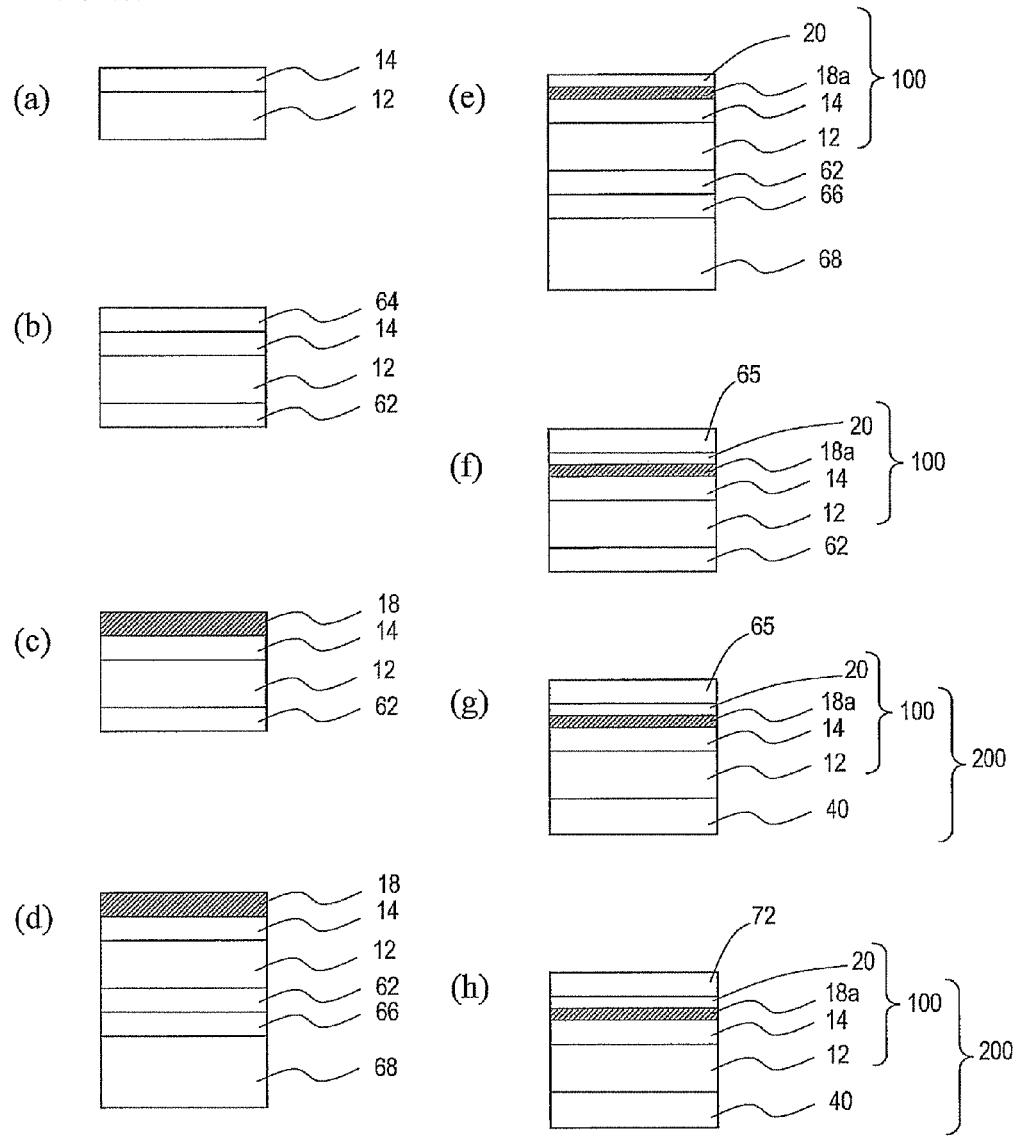
[FIG. 12] (a) to (h) are schematic cross-sectional views for illustrating a method for manufacturing a flexible mold 100 and a mold roll 200 that includes the flexible mold 100.

Next, a specific example of the method for manufacturing the flexible mold 100 and the moth-eye mold roll 200 that includes the flexible mold 100 is described with reference to FIG. 12.

First, as shown in FIG. 12(a), a base film is prepared which includes a polymer film 12 and a curable resin layer 14 provided on a surface of the polymer film 12. The polymer film 12 is, for example, a 188 μm thick PET film. Although the manufacturing process includes attaching and peeling of a protection film and a supporting plate on/from the base film, the base film, the protection film, and the supporting plate are integrally referred to as "base" in the following description for the sake of simplicity.

Then, as shown in FIG. 12(b), a front protection film 64 and a rear protection film 62 are attached onto the front surface of the curable resin layer 14 and the rear surface of the polymer film 12, respectively. By attaching the front protection film 64, the front surface of the curable resin layer 14 can be protected until a subsequent step of forming the aluminum layer 18. By attaching the rear protection film 62, the base can have improved firmness. If the thickness of the base is small, the base can have creases when handled. However, by attaching the rear protection film 62, generation of creases can be prevented. Also, the rear protection film 62 can prevent the rear surface of the polymer film 12 from becoming dirty.

Then, as shown in FIG. 12(c), the front protection film 64 is peeled off, and an aluminum layer 18 is formed on the curable resin layer 14. The aluminum layer 18 is formed by, for example, the above-described sputtering method, or the like.

Then, as shown in FIG. 12(d), a supporting plate 68 is attached onto the rear surface of the rear protection film 62. Here, for example, the supporting plate 68 may be attached via an adhesive layer 66. The supporting plate 68 may be a 3 mm thick substrate which is made of, for example, an acrylic resin. By attaching the supporting plate 68, the base is prevented from unduly bending in a treatment solution (an electrolytic solution in the anodization step and/or an etchant in the etching step) in a subsequent step of forming the porous alumina layer 20. Therefore, occurrence of nonuniform anodization and/or nonuniform etching can be prevented.

Then, anodization and etching are repeated according to the method which has been described with reference to FIGS. 1(a) to 1(e) to form the porous alumina layer 20. Then, the resultant base is dried. In this way, the flexible mold 100 is obtained (FIG. 12(e)).

Then, the adhesive layer 66 and the supporting plate 68 are peeled off, and the treatment solution is wiped away from the rear surface of the rear protection film 62. If the treatment solution remaining on the rear surface adheres to the porous alumina layer 20, the formed moth-eye structure may be eroded. After the treatment solution is wiped away, the supporting plate 68 is attached again via the adhesive layer 66.

Then, a mold release agent is applied to the surface of the porous alumina layer 20. The mold release agent may be applied by, for example, a dip method.

Then, as shown in FIG. 12(f), a second front protection film 65 is attached onto the porous alumina layer 20. Note that the second front protection film 65 may have the same structure as that of the above-described front protection film 64. The second front protection film 65 is attached for the purpose of preventing generation of scratches in the porous alumina layer 20. Meanwhile, in this step, the adhesive layer 66 and the supporting plate 68 are peeled off.

Then, as shown in FIG. 12(g), the base roll 40 is prepared, and a base (including the flexible mold 100 and the second front protection film 65) is fixed onto the perimeter surface of the base roll 40. Note that the base roll 40 is a cylindrical base which has the same structure as that of the base roll 40 that is used in the mold roll manufacturing method previously described with reference to FIG. 11. FIG. 12(g) schematically shows only part of the cylindrical base. In this way, the moth-eye mold roll 200 is obtained. Note that the rear protection film 62 is peeled off from the base immediately before the base is fixed onto the base roll 40. The flexible mold may be fixed according to the method which has been described with reference to FIG. 11.

When the mold roll obtained according to the above-described method is used to form a moth-eye structure in a work, the work 72 (for example, a material film with a curable resin surface layer) is placed on the porous alumina layer 20 as shown in FIG. 12(h). In the transfer process, for example, the structure may be transferred in parallel with peeling of the second front protection film 65.

Figure 13:
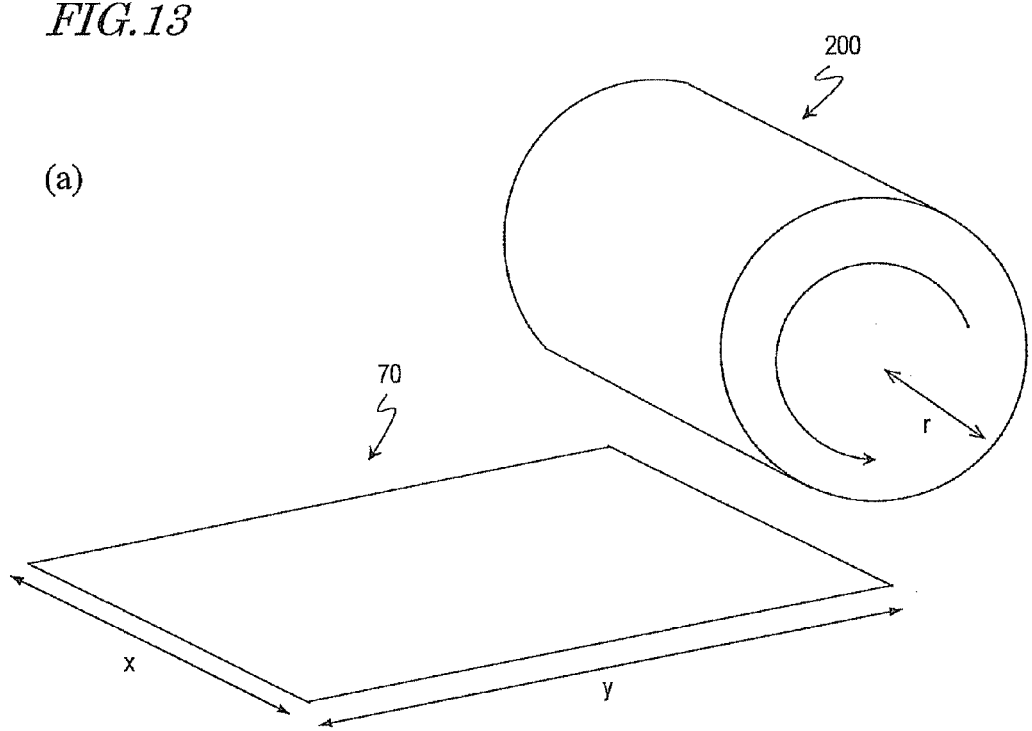
[FIGS. 13] (a) and (b) are schematic perspective views for illustrating a method for forming an antireflection structure on a polarizing plate 70.
Figure 13:
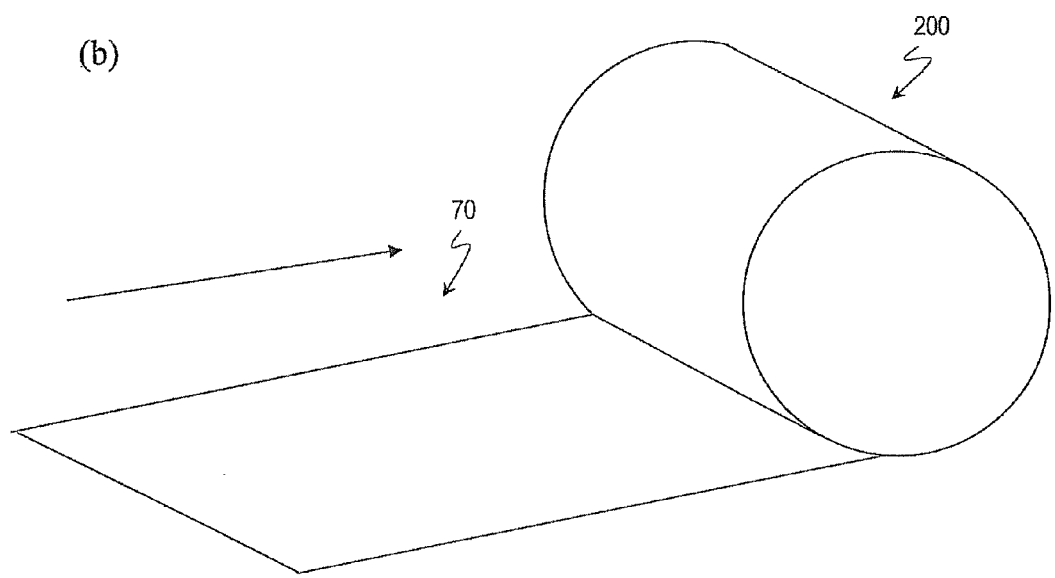

As an example of the method for forming a moth-eye structure with the use of a mold roll, a specific example of the method for forming an antireflection structure in a polarizing plate is described with reference to FIG. 13. FIGS. 13(a) and 13(b) are schematic perspective views for illustrating a method for forming a moth-eye structure in a polarizing plate 70 using the mold roll 200.

As shown in FIG. 13(a), the mold roll 200 and the polarizing plate 70 are prepared.

Then, as shown in FIG. 13(b), the mold roll 200 is brought into contact with the polarizing plate 70. Here, for example, a curable resin is applied over the surface of the polarizing plate 70 to form a material layer to which the structure is to be transferred, before the mold roll 200 is brought into contact with the material layer.

Thereafter, the polarizing plate 70 is moved relative to the mold roll 200 such that a moth-eye structure is formed over the polarizing plate 70. The direction of the movement is shown by the arrow in FIG. 13(b).

When the uneven structure is formed in a work using the mold roll, the work may undergo a stress in the perimeter direction of the roll (indicated by the arrow in FIG. 13(a)). On the other hand, the polarizing plate is commonly produced by uniaxial stretching. For example, the polarizing plate is produced by dyeing a PVA film with iodine and then stretching the dyed film such that iodine is aligned in the stretching direction. The direction in which the film is stretched is identical with the direction of the polarization axis of the polarizing plate. Here, if a stress is imposed on the polarizing plate in a direction which traverses the polarization axis, the alignment of iodine molecules is disturbed, so that the selection ratio of polarization decreases. Therefore, when the mold roll 200 is used to form a moth-eye structure in the polarizing plate 70, the polarization axis of the polarizing plate 70 is preferably parallel to the perimeter direction of the mold roll 200.

As described above, the mold roll 200 has a seam in the perimeter surface. If the length of the work (a length of the work along the direction in which the work is moved) is greater than the perimeter length of the mold roll 200, the shape of the seam is undesirably transferred to the work, so that the work has a discontinuous surface. Thus, the perimeter length of the mold roll 200 is preferably greater than the length of the work.

Thus, when a moth-eye structure is formed in the polarizing plate, the perimeter length of the mold roll 200 is preferably greater than the length of the polarizing plate 70 along the direction of movement (indicated by the arrow in FIG. 13(b)), length y. Here, the perimeter length of the mold roll 200 can be expressed as $2\pi r$ where r is the radius.

As described above, it is preferred that the direction of the polarization axis of the polarizing plate is identical with the perimeter direction of the mold roll 200. Therefore, when the polarizing plate 70 has a rectangular shape and the direction of the polarization axis of the polarizing plate is identical with the direction of the long side of the polarizing plate 70, the direction of the long side of the polarizing plate is preferably identical with the perimeter direction of the mold roll 200. Also, as described above, the perimeter length of the mold roll 200 is preferably greater than the length of the polarizing plate 70 along the direction of movement. Therefore, when the direction of the polarization axis of the polarizing plate is identical with the direction of the long side of the polarizing plate, the long side of the polarizing plate 70 (y) is preferably smaller than the perimeter length of the mold roll 200 ($2\pi r$).

Hereinafter, a specific example of the perimeter length of the mold roll ($2\pi r$) under the above-described circumstance where the polarization axis of the polarizing plate is parallel to the perimeter direction of the mold roll is described. When an antireflection structure is formed in a polarizing plate which is for use in a 26-inch display device that has a screen size of 569 mm×325 mm, a roll with the radius of 200 mm (perimeter length: 628 mm) may be used, such that the perimeter length of the mold roll is greater than the long side of the polarizing plate. Note that the perimeter length of the mold roll is preferably greater than the long side plus 23 mm (i.e., 592 mm). When the radius of the roll used is 200 mm, the perimeter length can be greater than the long side plus 23 mm. Likewise, as for a polarizing plate which is for use in a 32-inch display device that has a screen size of 700 mm×400 mm, for example, a roll whose radius is 250 mm (perimeter length: 785 mm) may be used, such that the perimeter length of the mold roll is greater than the long side plus 23 mm (i.e., 723 mm). A polarizing plate for a display device of a different size may also be configured in the same way.

As described above with reference to FIG. 5, an inverted moth-eye structure can be superposed over a mold that is used for formation of an uneven structure which performs an antiglare function. According to an embodiment of the present invention, however, an inverted moth-eye structure can be superposed over a mold in which another uneven structure is formed.

For example, an inverted moth-eye structure can be superposed over a mold in which a periodic uneven structure is formed. For example, an inverted moth-eye structure may be superposed over a mold for use in formation of an optical element which has a certain uneven shape in its surface, such as a lenticular lens, a brightness enhancement film (for example, a REF manufactured by Sumitomo 3M Limited), a light guide plate, a microlens array, a Fresnel lens, etc.

Figure 14:
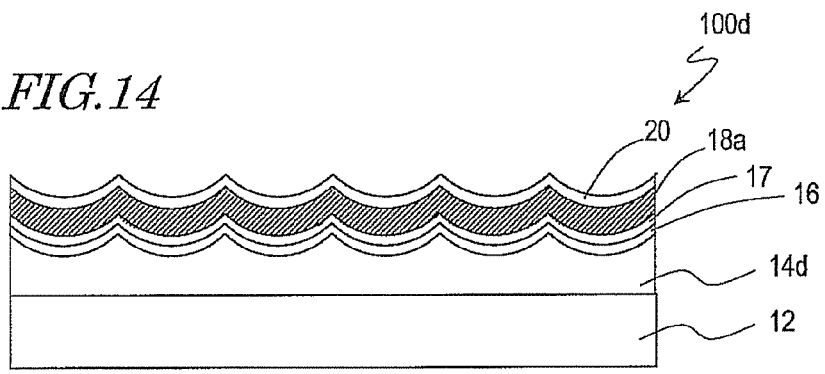
[FIG. 14] A schematic cross-sectional view of a mold 100d according to an embodiment of the present invention.

FIG. 14 schematically shows a mold 100*d* which is formed by superposing an inverted moth-eye structure over a mold that is used for formation of a lenticular lens. The mold 100*d* includes the polymer film 12, a curable resin layer 14*d* provided on a surface of the polymer film 12, the inorganic underlayer 16 provided on the curable resin layer 14*d*, the buffer layer 17 provided on the inorganic underlayer 16, the aluminum layer 18*a* provided on a surface of the buffer layer 17, and the porous alumina layer 20 provided on a surface of the aluminum layer 18*a*. As shown in FIG. 14, the surface of the curable resin layer 14*d* has a shape which is inverse to the periodic uneven structure of the surface of the lenticular lens. Using the mold 100*d* enables manufacture of a lenticular lens which has a moth-eye structure in its surface.

Hereinafter, a method for manufacturing the mold 100*d* is described with reference to FIG. 15.

Figure 15:
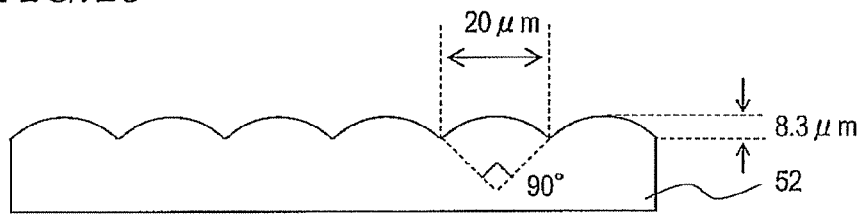
[FIG. 15] (a) to (c) are schematic cross-sectional views for illustrating a method for manufacturing a mold base 10d which is used for manufacturing a mold 100d according to an embodiment of the present invention.
Figure 15:
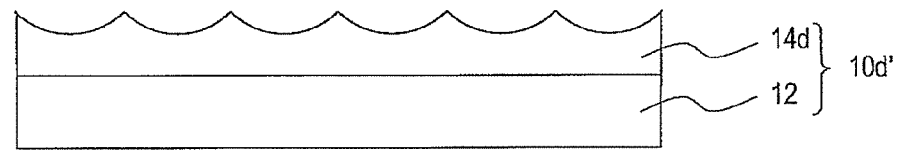
Figure 15:
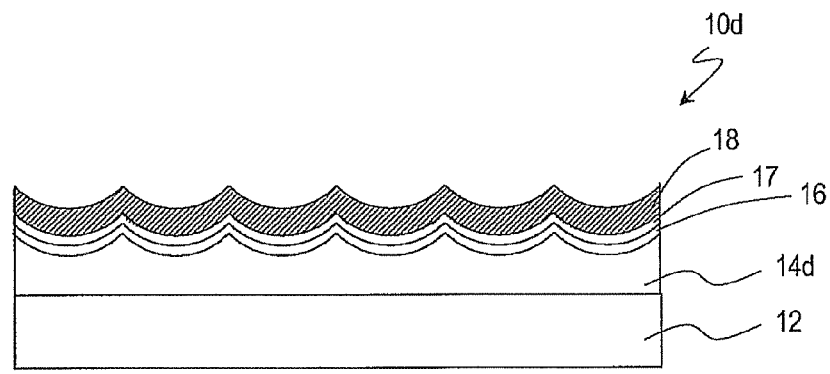

First, as shown in FIG. 15(*a*), a mold 52 which has an uneven structure that is similar to a lenticular lens is provided. The lenticular lens has a structure in which a plurality of semicylindrical lenses are arranged to extend in parallel. In a lenticular lens manufactured herein, the total size of the lenticular lens is 460 mm×365 mm, the pitch (the width of the semicylindrical lens) is 20 μm, and the central angle is 90° (a curve defined by intersection of the curved surface of the semicylindrical lens and a plane perpendicular to the longitudinal direction of the semicylindrical lens corresponds to a quarter of the circumference).

Then, as shown in FIG. 15(*b*), a curable resin layer (e.g., UV-curable resin layer) 14*d* which has an uneven structure that is inverse to the uneven structure of the mold 52 is formed on the surface of the polymer film 12 using the mold 52 shown in FIG. 15(*a*), whereby a base film 10*d'* is formed. The polymer film 12 may be, for example, a COP film or a PET film.

Then, as shown in FIG. 15(*c*), an inorganic underlayer (e.g., SiO$_2$ layer) 16, a buffer layer (e.g., aluminum oxide layer) 17, and an aluminum layer 18 are formed on the curable resin layer 14*d* which has the uneven structure that is inverse to the uneven structure of the mold 52 according to a method which is similar to the above-described method, whereby a mold base 10*d* is obtained. Anodization and etching are repeatedly performed on the mold base 10*d* according to the method which has been described with reference to FIGS. 1(*a*) to 1(*e*), whereby the mold 100*d* (FIG. 14) is obtained. Using the mold 100*d* enables manufacture of a lenticular lens which has a moth-eye structure in its surface. By fixing the mold 100*d* to a base roll, a mold roll that is capable of manufacturing a lenticular lens which has a moth-eye structure in its surface is obtained.

The above-described optical element has a periodic uneven structure, to which the present invention is not limited as a matter of course. An inverted moth-eye structure may be superposed over a mold which is designed to form a non-periodic uneven structure as in the case of the mold shown in FIG. 5 which has an uneven structure that performs an antiglare function.

Figure 16:
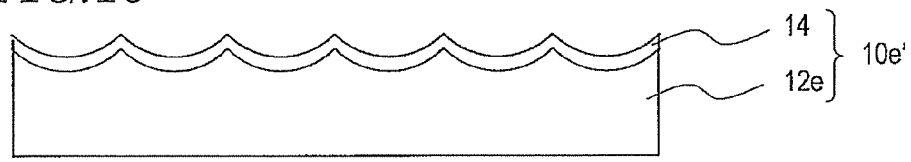
[FIG. 16] A schematic cross-sectional view of a base film 10e'.

According to the method described with reference to FIG. 15, the base film 10*d'* (FIG. 15(*b*)) is used which is manufactured by forming the curable resin layer 14*d* on the polymer film 12 and thereafter forming the curable resin layer 14*d* which has an uneven structure that is inverse to the uneven structure of the mold 52. The base film 10*e'* may be used which is manufactured by forming the curable resin layer 14 over the surface of the polymer film 12*e* that has a periodic uneven structure as shown in FIG. 16.

As described above, the perimeter surface of the mold roll 200 has a seam. At the seam, the flexible mold 100 is preferably arranged such that one of the edges is spaced away from the other edge.

Figure 17:
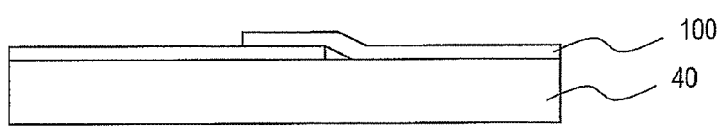
[FIGS. 17] (a) and (b) are schematic cross-sectional views for illustrating an arrangement of a seam of a mold roll.
Figure 17:
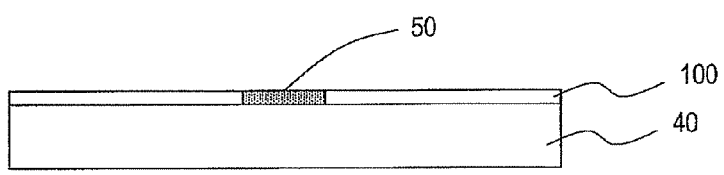

When one edge of the flexible mold 100 overlaps the other at the seam, the thickness is doubled at the seam so that there are level differences on the rims of the overlap as shown in FIG. 17(*a*). If the transfer is performed using a mold which has a level difference in the perimeter surface, the transfer will be unsuccessful at the level difference portion. For example, when the transfer is performed on a material film which is made of a curable resin, the resin staying at the level difference portion may be left uncured. The uncured resin may, for example, adhere to the material film when the material film is rolled up into a roll, and make the film dirty. Alternatively, air may be trapped at the level difference portion to form an air layer. The air layer may cause separation of the flexible mold 100 from the base roll 40. The level difference may be undesirably transferred to the material film.

On the other hand, in the case where the flexible mold 100 is arranged such that one edge is spaced away from the other edge as shown in FIG. 17(b), for example, the resin or the like may be supplied to fill the gap between the edges (the resin supplied in the gap is denoted by 50 in FIG. 17(b)), whereby the level difference is decreased or eliminated. Therefore, the above problem would not arise. Thus, the flexible mold 100 is preferably arranged such that one edge is spaced away from the other edge.

As the base film in which the moth-eye structure is to be formed, a base film which includes a polymer film whose edges are knurled may preferably be used. Here, knurling refers to providing raised portions at the edges of the film. Knurling is for the purpose of preventing the film from clinging when the film is rolled up.

Figure 18:
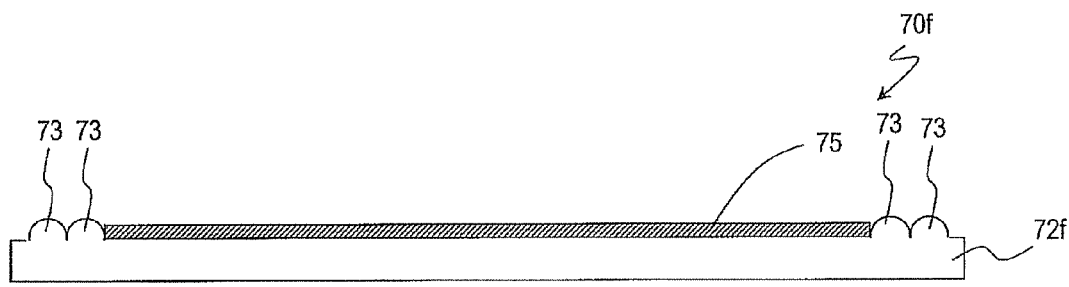
[FIG. 18] A schematic cross-sectional view of a base film 70f.

FIG. 18 shows a schematic cross-sectional view of a base film 70f which includes a knurled polymer film 72f. As shown in FIG. 18, the base film 70f includes the polymer film 72f which has a plurality of semicylindrical raised portions at the both edges and a photocurable resin layer 75 provided on the polymer film 72f. The photocurable resin layer 75 is made of, for example, a UV-curable resin and has a moth-eye structure in its surface. Here, the height of the moth-eye structure above the surface of the polymer film 72f (hereinafter, referred to as "the height of the moth-eye structure") is preferably equal to or smaller than the height of the raised portion 73 above the surface of the polymer film 72f (hereinafter, referred to as "the height of the raised portion 73"). If the height of the moth-eye structure is greater than that of the raised portion 73, the moth-eye structure may get scratches, or may be destroyed, when the base film is rolled up into a roll, due to friction with overlying part of the back surface of the base film. Generally, the height of the raised portion 73 formed by knurling is several tens of micrometers to about 100 μm. Therefore, a moth-eye structure is preferably formed such that, for example, the height above the surface of the polymer film 72f is about 6 μm to 10 μm. When there is a level difference at the seam in the perimeter surface of the above-described mold roll 200, the level difference is preferably smaller than the height of the raised portion 73. When the level difference in the perimeter surface of the mold roll 200 is smaller than the height of the raised portion 73, a level difference which is formed in the photocurable resin layer 75 by transfer of the level difference portion is smaller than the raised portion 73. Therefore, when the base film 70f is rolled up into a roll, the photocurable resin layer 75 would not come into contact with overlying part of the back surface of the film. Therefore, the probability of generation of scratches in the moth-eye structure or destruction of the moth-eye structure advantageously decreases.

The photocurable resin layer 75 is preferably formed by supplying a resin to a gap between the raised portions 73 at the both edges of the polymer film 72f. If the resin used for the photocurable resin layer is also supplied to the raised portions, the effect of knurling is undesirably decreased.

Industrial Applicability

A mold of the present invention is widely applicable to formation of a surface which has a moth-eye structure, for example, formation of an antireflection film.

Reference Signs List
10 mold base
12 polymer film
14 curable resin layer
16 inorganic underlayer
17 buffer layer
18, 18a aluminum layer
20 porous alumina layer
22 micropore
100, 200 moth-eye mold

The invention claimed is:

1. A flexible mold, comprising:
a flexible polymer film;
a curable resin layer provided on a surface of the polymer film; and
a porous alumina layer provided on the curable resin layer, the porous alumina layer having an inverted moth-eye structure in its surface, the inverted moth-eye structure having a plurality of recessed portions whose two-dimensional size viewed in a direction normal to the surface is not less than 10 nm and less than 500 nm.

2. The flexible mold of claim 1, wherein the curable resin layer contains an acrylic resin.

3. The flexible mold of claim 1, further comprising an inorganic underlayer between the curable resin layer and the porous alumina layer.

4. The flexible mold of claim 3, wherein the inorganic underlayer contains $SiO_2$.

5. The flexible mold of claim 3, wherein the thickness of the inorganic underlayer is not less than 50 nm and not more than 300 nm.

6. The flexible mold of claim 3, further comprising a buffer layer between the inorganic underlayer and the porous alumina layer, the buffer layer containing aluminum.

7. The flexible mold of claim 2, wherein the curable resin layer contains silica.

8. The flexible mold of claim 7, wherein a surface of the curable resin layer has a raised portion whose two-dimensional size is not less than 1 μm and less than 100 μm.

9. The flexible mold of claim 1, wherein a surface of the curable resin layer has a periodic uneven structure.

10. A mold roll, comprising the flexible mold as set forth in claim 1 and a base in the form of a roll,
wherein the flexible mold is fixed onto a perimeter surface of the base in the form of a roll.

11. The mold roll of claim 10, wherein the flexible mold is arranged such that there is a gap between one end and the other end.

12. A method for forming an antireflection structure on a polarizing plate, comprising the steps of:
providing the mold roll as set forth in claim 10 and a polarizing plate; and
moving the polarizing plate relative to the mold roll such that a polarization axis of the polarizing plate is parallel to a perimeter direction of the mold roll before forming the moth-eye structure on the polarizing plate.

13. The method for claim 12, wherein
the polarizing plate has a rectangular shape, and
a perimeter length of the mold roll is greater than a long side of the polarizing plate.

14. A method for manufacturing a flexible mold that has an inverted moth-eye structure in its surface, the inverted moth-eye structure having a plurality of recessed portions whose two-dimensional size viewed in a direction normal to the surface is not less than 10 nm and less than 500 nm, the method comprising the steps of:
(a) providing a mold base which includes a flexible polymer film, a curable resin layer provided on a surface of the polymer film, and an aluminum layer provided on the curable resin layer;
(b) partially anodizing the aluminum layer to form a porous alumina layer which has a plurality of very small recessed portions;

(c) after step (b), allowing the porous alumina layer to be in contact with an etching solution, thereby enlarging the plurality of very small recessed portions of the porous alumina layer; and (d) after step (c), further anodizing the porous alumina layer to grow the plurality of very small recessed portions.

15. The method for claim 14, wherein step (c) and step (d) are further performed after step (d).

* * * * *